United States Patent [19]

Brown et al.

[11] Patent Number: 5,131,007
[45] Date of Patent: Jul. 14, 1992

[54] DIGITAL VOTER FOR MULTIPLE SITE PSTR TRUNKING SYSTEM

[75] Inventors: Thomas A. Brown; Charles L. Derenge, both of Lynchburg; Marcella M. Tucker, Amherst; Vicki J. Teel, Goode; Houston H. Hughes, III, Lynchburg, all of Va.

[73] Assignee: General Electric Company, Schenectady, N.Y.

[21] Appl. No.: 363,980

[22] Filed: Jun. 9, 1989

[51] Int. Cl.$^5$ .................. H04B 07/02; H04B 01/02
[52] U.S. Cl. ............................ 375/40; 370/85.8; 370/85.2; 340/825.06; 455/133; 455/52.1
[58] Field of Search ............... 375/40, 100; 370/85.8, 370/40, 32, 85.2; 340/825.06, 825.39, 825.40, 825.07; 455/10, 47, 62, 133, 52, 53, 32, 134, 135

[56] References Cited

U.S. PATENT DOCUMENTS

| | | | |
|---|---|---|---|
| 3,701,109 | 10/1972 | Peters | 340/825.51 |
| 4,013,962 | 3/1977 | Beseke et al. | 455/8 |
| 4,128,809 | 12/1978 | Kage | 375/100 |
| 4,232,294 | 11/1980 | Burke et al. | 340/825.5 |
| 4,317,218 | 2/1982 | Perry | 455/10 |
| 4,317,220 | 2/1982 | Martin | 455/53 |
| 4,395,710 | 7/1983 | Einolf, Jr. et al. | 340/825.5 |
| 4,475,246 | 10/1984 | Batlivala et al. | 455/18 |
| 4,516,269 | 7/1985 | Krinoch | 455/51 |
| 4,530,087 | 7/1985 | Yamamoto | 375/40 X |
| 4,570,265 | 2/1986 | Thro | 455/52 |
| 4,583,089 | 4/1986 | Cope | 340/825.05 |
| 4,593,282 | 6/1986 | Acampora et al. | 340/825.5 |
| 4,623,886 | 11/1986 | Livingston | 340/825.5 |
| 4,628,311 | 12/1986 | Milling | 340/825.5 |
| 4,638,311 | 1/1987 | Gerety | 340/825.06 |
| 4,642,630 | 2/1987 | Beckner et al. | 340/825.5 |
| 4,644,348 | 2/1987 | Gerety | 340/825.06 |
| 4,652,873 | 3/1987 | Dolsen et al. | 370/85.6 |
| 4,677,612 | 6/1987 | Olson et al. | 340/825.05 |
| 4,682,324 | 7/1987 | Ulug | 340/825.5 |
| 4,696,051 | 9/1987 | Breeden | 455/33 |
| 4,696,052 | 9/1987 | Breedon | 455/51 |
| 4,707,693 | 11/1987 | Hessel | 340/825.51 |
| 4,835,731 | 5/1989 | Nazarenko et al. | 455/14 X |
| 4,868,851 | 9/1989 | Trinidad et al. | 375/40 |
| 4,905,302 | 2/1990 | Childress et al. | 455/32 X |
| 4,972,507 | 11/1990 | Lusignan | 455/51 |

FOREIGN PATENT DOCUMENTS 61-107826 5/1986 Japan .

Primary Examiner—Benedict V. Safourek
Assistant Examiner—Tesfaldet Bocure
Attorney, Agent, or Firm—Nixon & Vanderhye

[57] ABSTRACT

A digital voter system for a multi-site public service trunking (PST) digitally trunked RF communications system operates on the principle that it is highly likely that messages received during a system redundancy removal period are redundant messages. For a given RF channel, digital receiver is associated with each of multiple sites and receives digital messages reported to it by its associated sites. The multiple digital receivers are connected to a digital selector via a service request line (FSL) and a serial data line (BSL). Digital receivers which have messages to transfer to the digital selector attempt to seize the service request line and, if they successfully seize it, maintain the line in its seized state for the redundancy removal period. Digital receivers which have messages but discover the service request line is already seized simply discard their messages. Since it is likely that two digital receivers may successfully seize the service request line at or near the same time, a windowing technique is used to schedule the times different digital receivers may apply their messages to the serial data line. If a digital receiver sees signals on the serial data line before it is scheduled to begin transmitting, it discards its message and aborts its transmission attempt. The preferred embodiment voter thus handles messages very rapidly (to reduce system latency time) while effectively removing most redundant messages and reducing or eliminating data collision on the shared serial data bus.

22 Claims, 11 Drawing Sheets

BSL/FSL PROTOCOL

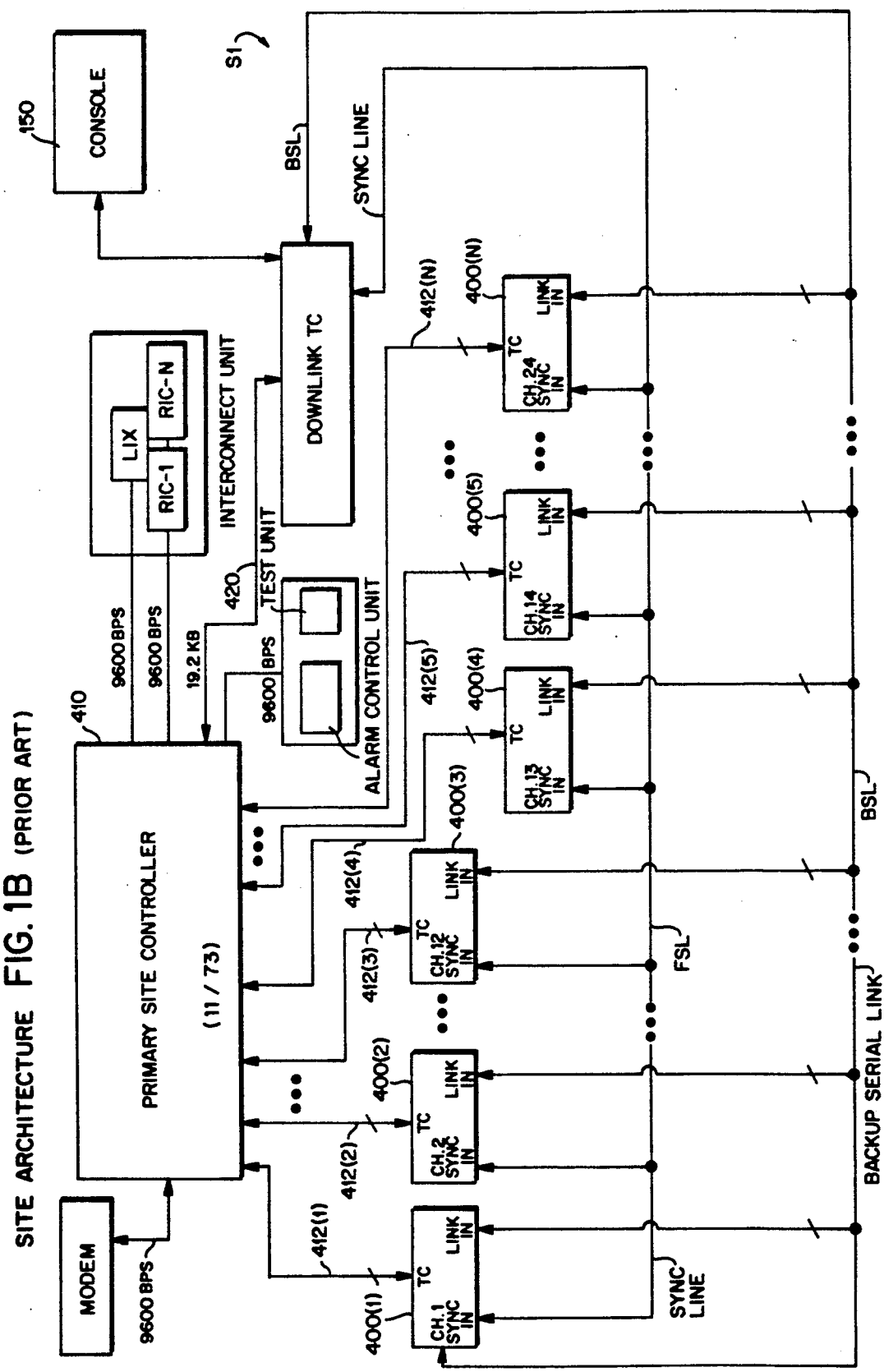
FIG. 1B (PRIOR ART) SITE ARCHITECTURE

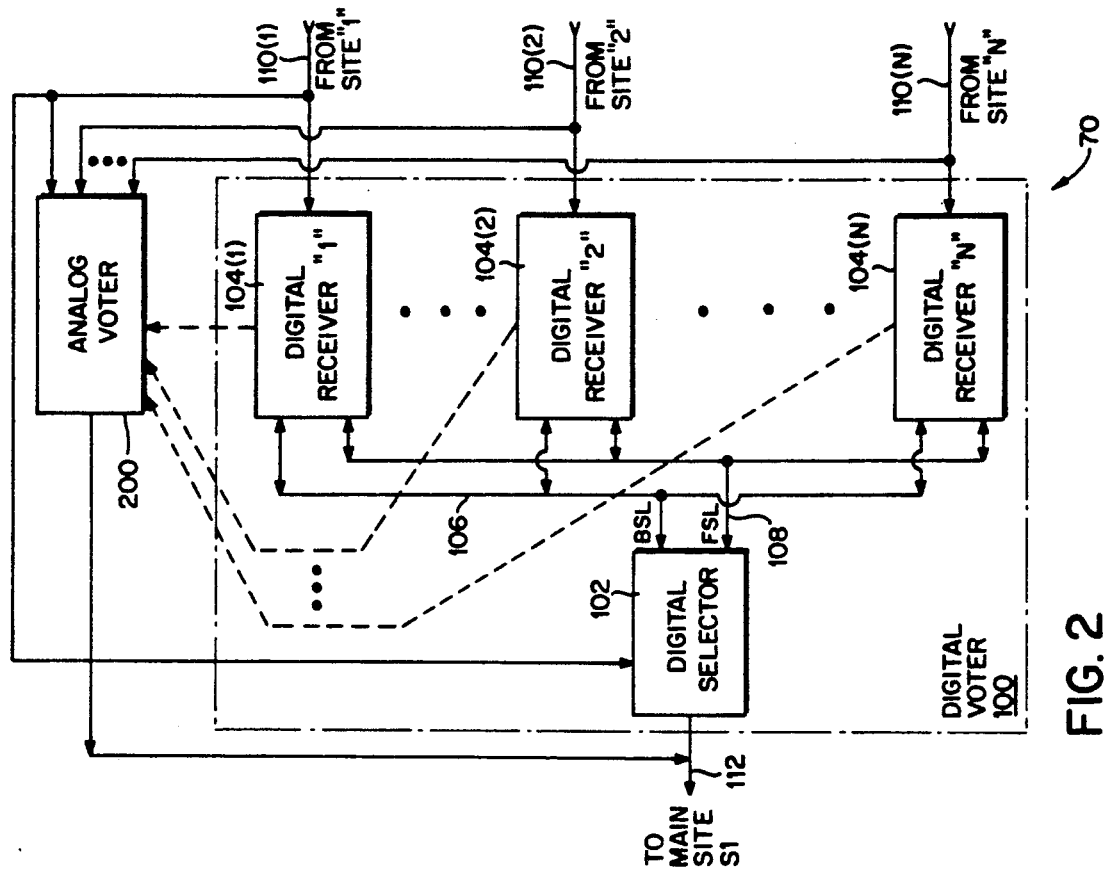
FIG. 2
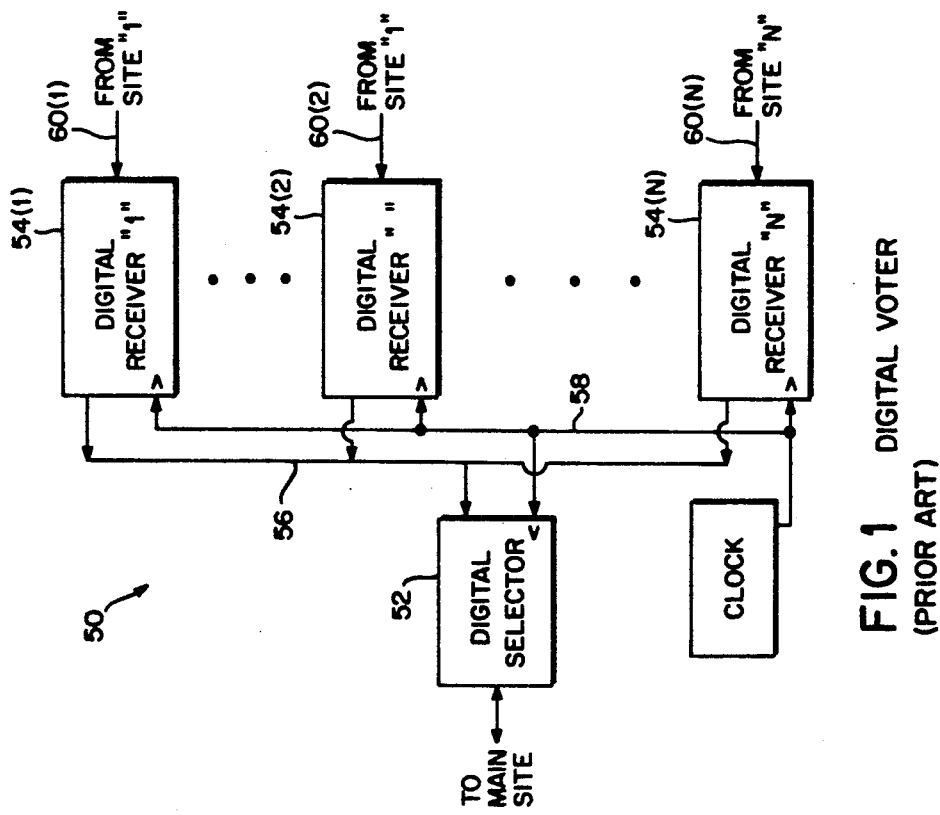
FIG. 1 DIGITAL VOTER (PRIOR ART)

BSL/FSL PROTOCOL

WINDOW PRECISION "SIMULTANEOUS"

BSL/FSL PROTOCOL

WORKING CHANNEL DIGITAL RECEIVER ROUTINE

WORKING CHANNEL DIGITAL RECEIVER ROUTINE

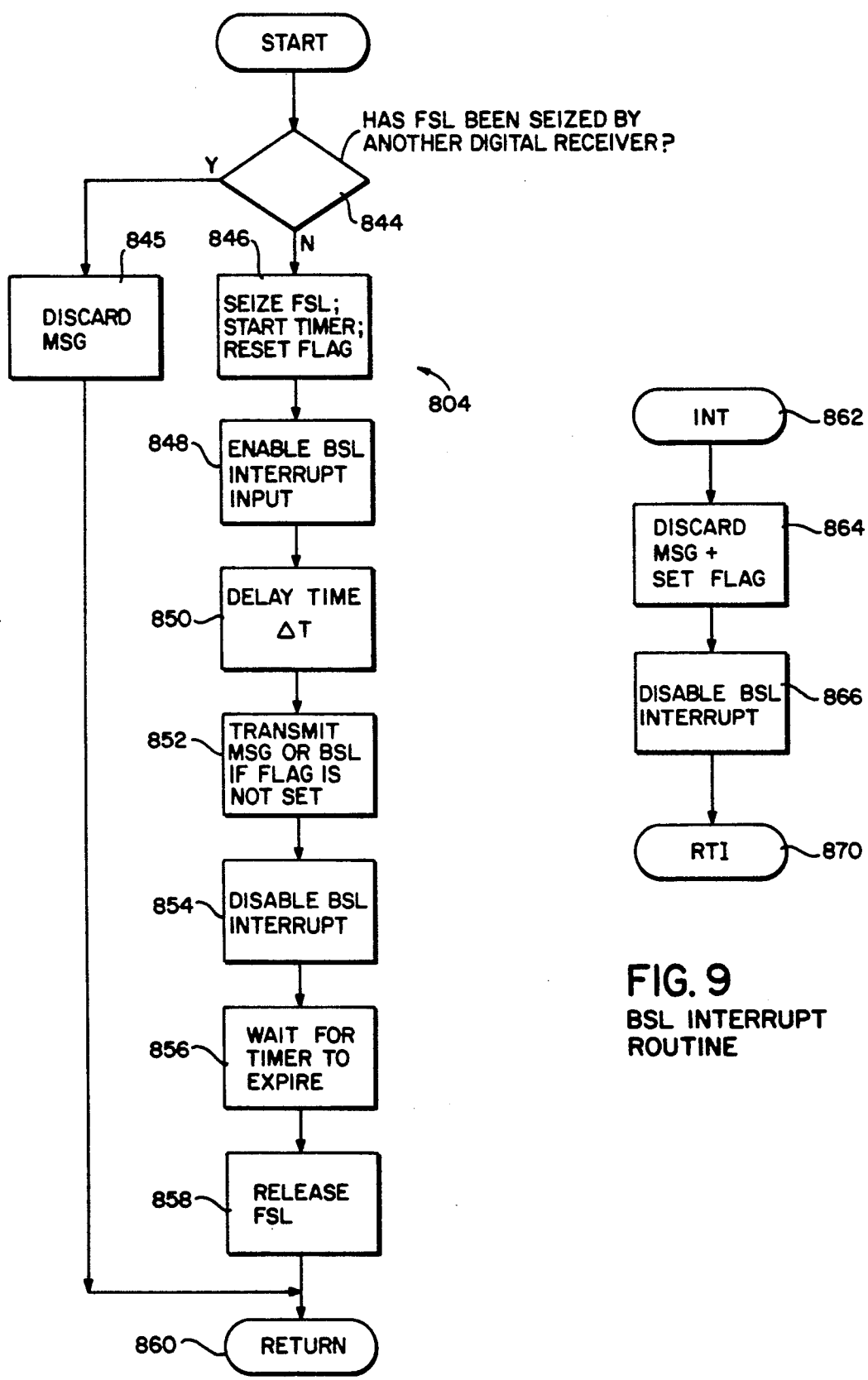

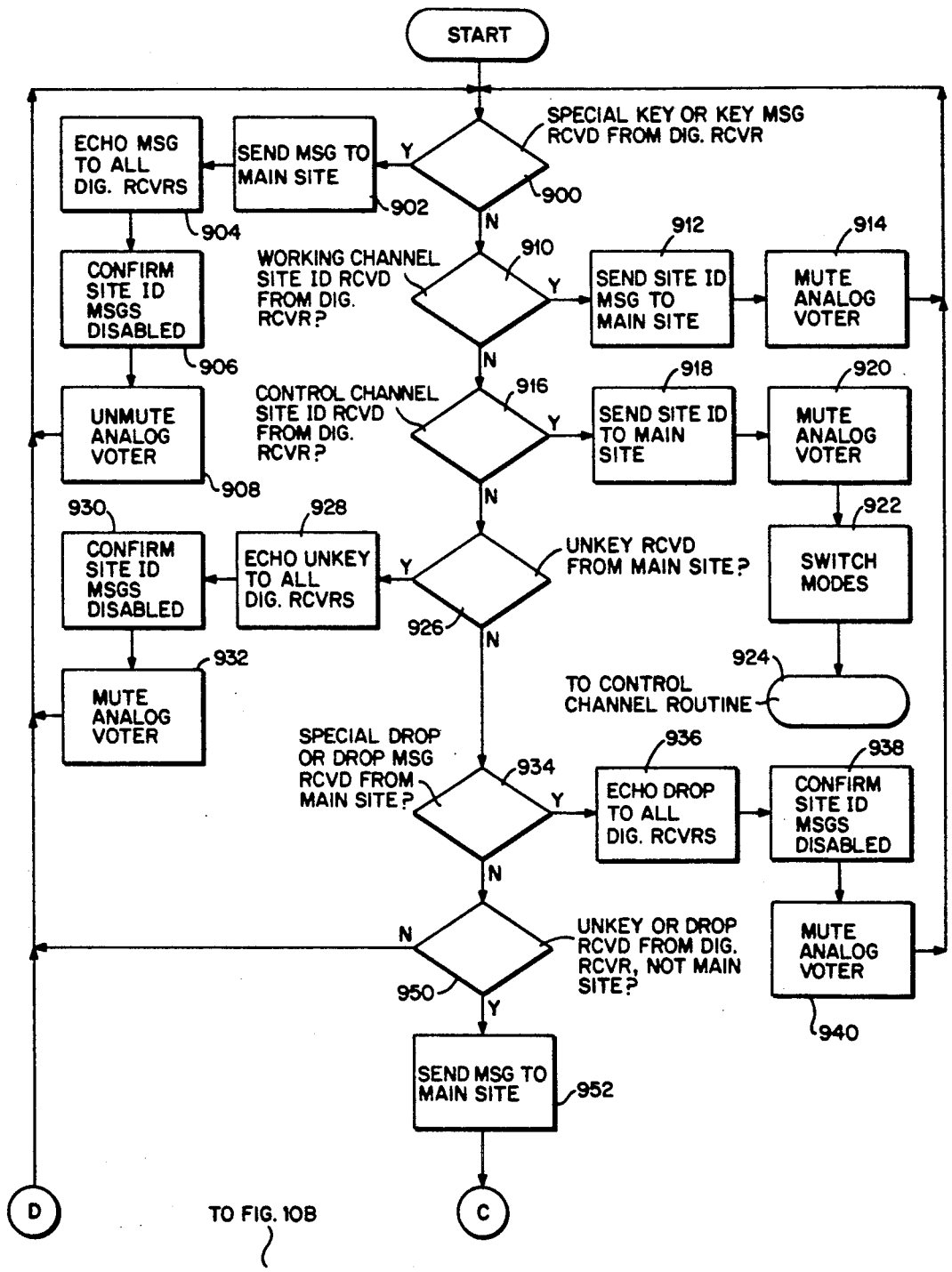
FIG. 10A WORKING CHANNEL SELECTOR ROUTINE

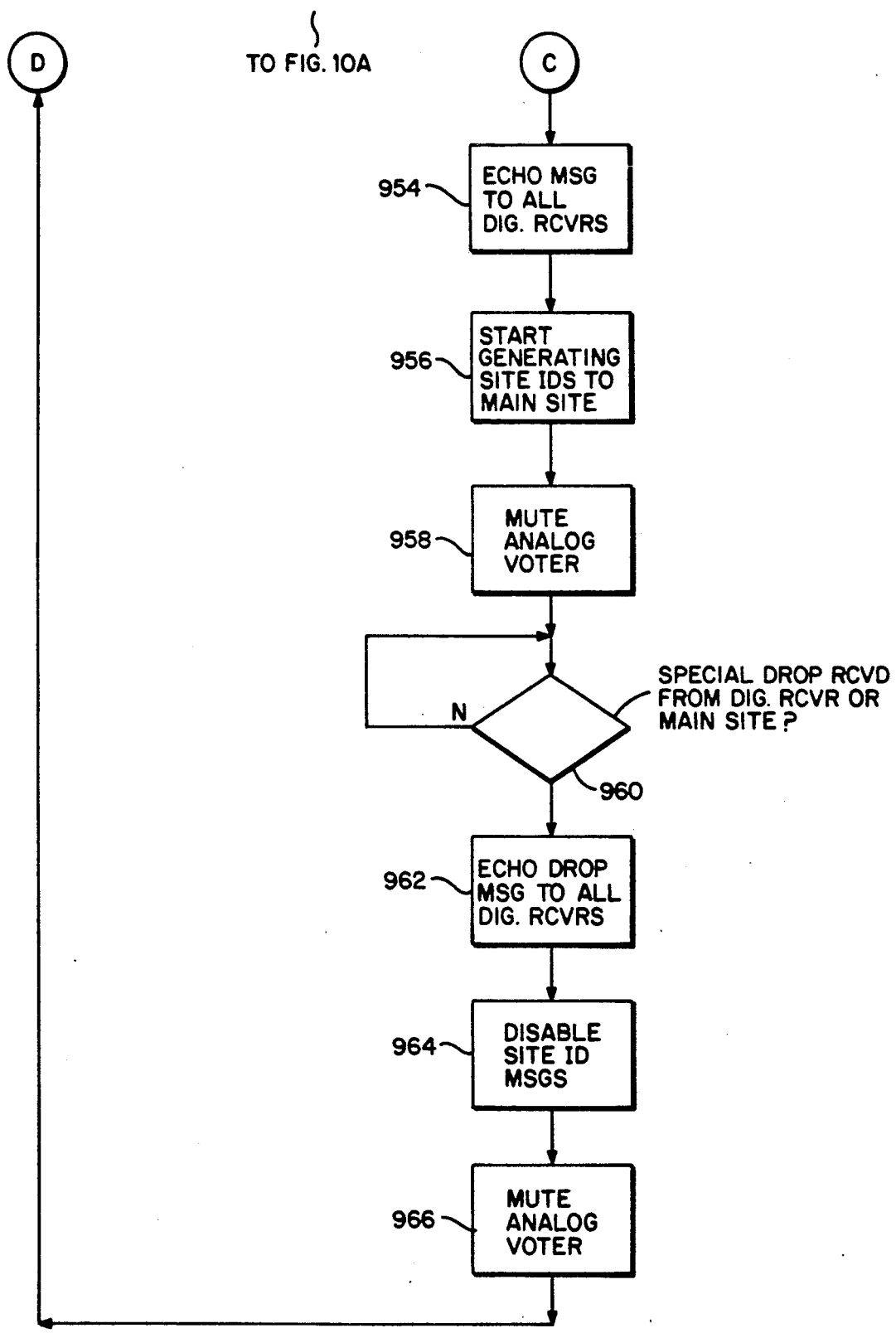
FIG. 10B WORKING CHANNEL SELECTOR ROUTINE

DIGITAL VOTER FOR MULTIPLE SITE PST R TRUNKING SYSTEM

FIELD OF THE INVENTION

The present invention relates to digital trunked radio communications systems, and more specifically to such communications systems including multiple receiving sites. Still more particularly, the invention relates to an arrangement for receiving several identical incoming messages from different radio receiver sites, for "voting" on (and thereby selecting) one of those several messages, and for passing the selected message on to a main site.

BACKGROUND AND SUMMARY OF THE INVENTION

Modern trunked radio communications systems typically include geographically distributed "satellite" receiving sites in addition to one or more main transmitting site. Consider a simple system including only one main transmitting/repeater site. The main transmitting/repeater site is typically located at a relatively high elevation (e.g., on the top of a hill, mountain or tall building) and generally is provided with relatively high powered RF transmitters to permit the site to "cover" a large desired geographical service area. The main site transmitter output power and other factors contributing to the "effective radiated power" (ERP) are selected so that signals transmitted by the main site can be received at acceptable signal strength throughout the desired service area.

Unfortunately, most or all of the mobile and portable RF transceivers served by the main site cannot provide the same high effective radiated power as is provided by the main site because of several limiting factors.

While the main site transmitter power output can be in the range of several hundreds or thousands of watts RF, a mobile transceiver may be capable of providing only 5 to 25 watts of RF at its output and portable (e.g., hand held) transceivers may be capable of generating even less power (e.g., on the order of 1 watt or even less). Size and cost limitations to a large degree dictate the limited RF power outputs of mobile and portable units, but power source limitations are perhaps the most critical factor. A portable transceiver using a few small nickel-cadmium battery cells as its power source can provide only low power output levels. Mobile transceivers can obtain additional power from a vehicle electrical system, but even this power source imposes serious constraints on the maximum power supply current the transceiver can draw.

Since the various mobile and portable transceivers within a radio communications system have vastly lower effective radiated power outputs than do the transmitters at the main site, all mobile/portable transceivers within the service area can typically receive the strong transmissions from the main site but the receivers located at the main site may not receive the weaker transmissions from the mobile and portable transceivers (or may receive the transmissions at signal strengths which are too low to provide useful, reliable communications). In other words, the "talk in" range of the main site is typically less than its "talk out" range.

Multiple receiving sites have been employed in the past to help solve this problem. Typically, so-called "satellite" receiving sites are provided at various geographical locations within the service area. The main site is provided with a full complement of receivers, and similar receivers are provided at each satellite receiving site. When a mobile or portable receiver transmits within the service area, some or all of the satellite receiving sites and the main site may receive the transmission. Depending upon where in the service area the transmitting mobile/portable happens to be at the time it transmits, some sites will receive the transmission at high signal strength levels, other sites will receive the transmission at lower levels, and some sites may not receive the transmission at all, for example, if an obstruction or very long signal path exists between the mobile/portable and the site.

Of course, the communication system needs to receive a given mobile/portable transmission only once at a useful signal level. It is desirable therefore to select only one version of the received message and to discard or ignore redundant versions of the received message (this process can be called "redundancy removal"). Since the various receiving sites receive a given mobile/portable transmission at different average signal strengths, it may, for example, be desirable in some systems to select the version of the transmission received with the best quality (e.g., highest average signal strength or lowest bit error rate) since that version is most likely to have carried the communicated information reliably and correctly (noise, fading and other effects can degrade reception of weak signals). In many prior art systems, all sites which receive the transmission generate an indication of the quality of the received signal (e.g., based on received signal strength and/or other factors). The overall communication system then typically may "vote" based on the quality indications reported by the different receiving sites to select a single version of the received signal for use. Commonly assigned U.S. Pat. No. 4,317,218 to Perry (1982) describes in detail one example of this type of prior art voting circuit within a repeater station control system. See also, for example, U.S. Pat. No. 4,013,962 to Beseke et al (1977).

Things happen very rapidly in state-of-the-art digital trunking systems such as The General Electric Company 16-PLUS Public Service Trunking (PST) digitally trunked radio communications system. The architecture and operation of this system is disclosed in much greater detail in the following co-pending commonly assigned U.S. patent applications (which are incorporated by reference herein):

U.S. Ser. No. 07/056 922 Childress et al field Jun. 3, 1987, issued Jul. 27, 1990, now U.S. Pat. No. 4,905,302;

U.S. Ser. No. 07/057,046 Childress et al filed Jun. 3, 1987, and

U.S. Ser. No. 07/085,572 Nazarenko et al filed Aug. 14, 1987, issued May 30, 1989, now U.S. Pat. No. 4,835,731.

Briefly, GE's PST system communicates digital data at 9600 baud in "slotted" message frames each having a duration of 30 ms. These "slots" are closely (although not exactly) synchronized in time across all channels (for both inbound and outbound communications) and follow the "slot" timing of the digital control channel. Some messages use only a single slot, while other messages occupy two slots. A mobile transceiver requiring a channel assignment will in GE's preferred system transmit a channel assignment request message in one or more successive predefined time slots on the inbound control channel and then wait for a responsive two-slot channel assignment message to be transmitted by the main site on the outbound control channel. The mobile transceiver expects to receive a response (of some sort) to its request message within a relatively short time period (e.g., so the mobile can rapidly determine if its request was ignored and retransmit the request). In configurations including multiple satellite receiving sites, it is necessary during this short time period for the system to select a single version of the received message and pass it to the main site for processing and response. In a system having a main site and two satellite receiving sites, for example, the following may occur:

(a) the main site receives and decodes the message;

(b) satellite receiving site (1) receives and decodes the message;

(c) satellite receiving site (2) receives and decodes the message;

(d) the main site receives and decodes the message;

(e) satellite receiving sites (1) and (2) and the main site communicate the message versions they received (assuming they each received the message) to a centralized voter (e.g., located at the dispatch console);

(f) the voter "votes" on the versions of the messages received by the main and satellite sites to select a single version of the message (and preferably also discards all non-selected versions while somehow ensuring that the messages being discarded are in fact redundant versions of the same message rather than different messages);

(g) the system processes the selected version of the message and generates an appropriate responsive message; and (h) the generated responsive message is transmitted over the main site outbound control channel for reception by the mobile.

The term "system latency" refers to the amount of time it takes for a message to propagate through the system. For example, one measure of system latency is the delay from when a mobile transceiver user keys his microphone (e.g., thereby generating a working channel assignment request) to the time the mobile transceiver receives a responsive message back from the system. Obviously, it is desirable to minimize system latency since rapid access and rapid system response provide great advantages in terms of user friendliness, system throughput, and the like. In the GE PST system, this particular system latency parameter has a maximum of 90-100 milliseconds—and the mobile will automatically retransmit its request if such a time period elapses and no response has yet been received. Thus, it is generally necessary for steps (a)-(h) described above to be performed within 100 ms or less in the GE PST system.

For such minimal system latency to be achieved, each of steps (a)-(h) must be performed as rapidly as possible. The delays introduced by some of the steps cannot be significantly reduced because of practical considerations and the laws of physics (e.g., it takes a certain finite amount of time to receive and decode an RF message being transmitted, it takes a finite amount of time to transmit a received message over a landline from a satellite site to a central location, and it takes a certain finite amount of time to transmit a responsive RF message over the control channel). The time required by step (f) to "vote" on one received message and to discard redundant versions of the same message should therefore be minimized in order to reduce overall system latency.

Prior digital voter architectures for multiple receiver site systems have not provided the rapid message handling/selection capabilities required to minimize system latency in high speed digital communications systems.

FIG. 1 is a schematic block diagram of a prior art digital voter architecture 50 used in the past by GE in its Voice Guard Digital Voter (described in greater detail in GE Publication LBI-31600. Voter 50 includes a digital selector 52 and plural digital receivers 54 connected together via a bus 56. In the embodiment shown, digital receiver 54(1) receives messages in digital form from receiver site 1, digital receiver 54(2) receives messages in digital form from receiver site 2, . . . , and digital receiver 54(N) receives messages in digital form from receiver site N. Each receiver 54 stores the messages it receives in a temporary buffer for selection by digital selector 52.

Digital selector 52 must determine which of digital receivers 54 have stored received messages and select one of multiple redundant messages if more than one digital receiver has stored the same received message. In the past, these steps were performed by a polling process over the bus 56. Specifically, digital selector 52 (or some other "bus controller" component) would periodically and successively send a signal over bus 56 (which could be a conventional serial or parallel data bus) to each of the digital receivers 54 in turn. This signal in effect "asked" each of the digital receivers 54, one at a time, whether they had received a message. If one of digital receivers 54 responded that it had received a message, then digital selector 52 would grant that digital receiver permission to transmit its received message to it over the bus 56. Contentions for bus 56 were avoided because the only time a digital receiver 54 could transmit on the bus was when it was granted permission to do so by digital selector 52—and the digital selector would only grant such permission to one digital receiver 54 at a time.

A significant problem with the polling approach is that it introduces too much delay for PST. Each digital receiver 54 must be polled individually, and each poll takes a certain amount of time T. If N is large (i.e., there are a large number of satellite sites), the process of polling all digital receivers will take (T*N) seconds. In the worst case where a satellite site n is the only site to receive a particular RF message (from say a portable transceiver) and at the time this received message is communicated to corresponding digital receiver 54(n) the digital selector 52 has just finished polling digital receiver 54(n) and is about to poll digital receiver 54(n+1) (assuming a polling sequence in ascending order of 1−N) , it will take the full (T*N) seconds before digital selector 52 again polls digital receiver 54(n) to determine that a message has been received. Additional time will then be required to notify digital receiver 54(n) that it has been granted permission to transmit over bus 56, and still additional time is required to actually transfer the message from digital receiver 54(n) to digital selector 52.

An alternate technique used in the past to communicate messages from the digital receivers 54 to digital selector 52 uses acknowledgements to eliminate the requirement of a bus controller (and the additional time delay a controller introduces). In this alternate arrangement, an "ACK/NACK" technique is used to resolve "bus contentions" that occur whenever two digital receivers 54 try to simultaneously transmit messages over bus 56. Using this technique, each digital receiver 54 can autonomously transmit on bus 56 as soon as it receives a message so long as no other digital receiver is already actively transmitting. Digital selector 52 receives all messages transmitted on bus 56, places a responsive "acknowledgement" (ACK) message onto the bus whenever it correctly receives a message, and places a "negative acknowledgement" (NACK) message onto the bus whenever it incorrectly receives a message. Since upon the occurrence of a bus contention digital selector 52 does not correctly receive any of the contending messages, it sends a NACK signal which causes both of the transmitting digital receivers 54 to resend their messages. This technique thus avoids the time overhead involved in polling and would appear to provide a very efficient solution to a multi-site trunked digital voter.

However, this ACK/NACK arrangement described above cannot provide satisfactory performance in a digital voter for a trunking system such as GE's PST system—because it is possible and probable that multiple digital receivers will simultaneously attempt to transmit on bus 56. This is because all satellite sites typically receive a given transmitted RF message at about the same time (slight variations in receive time are attributable to different RF path lengths between the transmitting station and the satellite receiver stations) and communicate the received messages to the voter at about the same time (variations in communication time are attributable to differences in landline distance for example). Thus, it is highly probable that several versions of the same message will arrive almost simultaneously at different voter digital receivers 54. Each of the different voter digital receivers 54 may then use "carrier sense" or some other similar technique before attempting to transfer their received message to the selector to ensure that bus 56 is not in use —but will find that the bus is not in use (since none of the other digital receivers which have received versions of the same message have yet had the chance to begin transmitting). Consequently, some or all of the digital receivers 54 will begin transmitting on bus 56 virtually simultaneously—causing a "bus collision" which prevents digital selector 54 from correctly receiving any of the messages placed on the bus. While the ACK/NACK technique typically will eventually resolve the contention (e.g., especially when used in conjunction with a "random retry" or other technique preventing further bus collisions by the contending digital receivers 54), the contention resolution takes far too much time and introduces too much delay into the voting process.

Various bus contention resolution schemes are known in the computer field for efficiently resolving contentions on a common bus. The following is a (by no means exhaustive) listing of a few examples of such contention resolution schemes:

U.S. Pat. No. 4,628,311 to Milling
U.S. Pat. No. 4,623,886 to Livingston
U.S. Pat. No. 4,395,710 to Einolf Jr. et al
U.S. Pat. No. 4,638,311 to Gerety
U.S. Pat. No. 4,644,348 to Gerety
U.S. Pat. No. 4,652,873 to Dolsen et al
U.S. Pat. No. 3,701,109 to Peters
U.S. Pat. No. 4,232,294 to Burke et al
U.S. Pat. No. 4,593,282 to Acampora et al
U.S. Pat. No. 4,642,630 to Beckner et al
U.S. Pat. No. 4,583,089 to Cope
U.S. Pat. No. 4,677,612 to Olson et al
U.S. Pat. No. 4,682,324 to Ulug
U.S. Pat. No. 4,707,693 to Hessel.

However, it is not readily apparent if or how any of the techniques described in the patents listed above might be applied to a digitally trunked communication system satellite receiving site digital voter. In particular, the digital voter requirements for the GE 16 PLUS digitally trunked PST communications system are highly unusual and are not readily analogous to, for example, the peripheral bus of a computer system or a local area network (LAN).

In the case of a computer system peripheral bus or LAN, for example, the statistical probability of two nodes transmitting during a certain time period generally is directly proportional to the duration of the time period. It is relatively unlikely that two nodes will need to independently initiate a new bus communication at exactly the same instant in time (i.e., unless the bus or LAN has been unavailable for awhile because of other communications or the like or unless the peripheral communications are actually being initiated in response to the same previous bus communication). On the other hand, it may be relatively likely that two nodes will need to transmit at nearly the same time (e.g., depending upon the number of nodes on the bus/LAN and various other factors). Thus, the probability of a contention on the "macro" level (e.g., overlapping but not exactly simultaneous communications) is much higher than the probability of a contention on the "micro" level (e.g., where two nodes need to transmit beginning at almost exactly the same time). In addition, the problem of redundant contending messages (and "redundancy removal") does not exist on a LAN or peripheral bus—since all of the contending messages need to be communicated sooner or later.

In contrast, in the GE PST system presents entirely different contention problems because of system considerations. In particular, in the GE PST system all "inbound" messages are transmitted beginning at the edge of a 30 ms "slot edge" (defined by synchronization signals on the outbound control and working channels, with the sync signals on each working channel being synchronized with the control channel sync signals). If two mobile/portable transceivers attempt to transmit at or near the same time, their transmissions will either fall within different inbound slots (and thus be separated by 30 ms)—or they will fall within the same slot (and thus be virtually simultaneous). However, a contention between RF signals on the inbound control channel typically results in destroying both transmissions and causing both contending transmitters to "retry" (e.g., using random retry wait periods).

Hence, it is highly probable in the GE PST System that all satellite sites receiving a message within a given inbound "slot" will be receiving the same message. Likewise, the digital receivers 54 associated with the satellite sites will receive the corresponding digital messages (and thus need to apply the messages to the bus 56) virtually simultaneously. These messages are therefore likely to be redundant versions of the same message of which only one version needs to be selected and communicated to digital selector 52 (and the nonselected versions of which should be discarded immediately to allow the receivers to handle messages in the next incoming slot).

Hence, in the GE PST system, the probability of "macro" contentions on bus 56 is small or nonexistent, the probability of "micro" contentions is relatively high (in fact, virtually all contentions will be of the "micro"

variety), and it is extremely likely that contending messages will be redundant versions of the same message.

It would be highly desirable to provide a digital voter for a high date rate digitally trunked radio communication system that eliminates data collisions on the voter bus, removes most or all redundant messages, and does not significantly impact system latency.

The present invention provides a digital voter arrangement which uses a "windowing" technique to arbitrate bus contention on an asynchronous common communication link. This digital voter arrangement reduces communication latency by entirely eliminating bus assignment by a controller (and eliminates the corresponding message overhead required by the controller), yet still prevents message collisions on the common bus. The digital voter provided by the invention also efficiently eliminates most of the redundant messages.

Briefly, a "serve request" type commmunications line (FSL) connects a plurality of digital receivers (receiving messages from corresponding plural RF receiving sites) contending for use of a serial data line (BSL) in the preferred embodiment. Data is transmitted from the digital receivers to a digital selector over the BSL. Bus collisions are prevented and redundancy removal is provided through two interrelated mechanisms.

The first mechanism relates to the FSL, which is normally in an inactive state but can be seized (controlled) by any of the plural digital receivers. When a digital receiver has received a message from its associated satellite receiver and wishes to transfer this message to the digital selector, it must first gain access to the FSL (no digital receiver is authorized to transmit on the BSL unless it has first seized the FSL). To gain access to the BSL, it tests the state of the FSL. If the FSL is inactive, the digital receiver seizes the FSL in preparation for transmitting on the BSL. In the preferred embodiment, whenever a digital receiver seizes the FSL, it continues to hold the FSL in the active state for the duration of a redundancy removal period. Any digital receiver having a message to transfer on the BSL which finds the FSL already seized assumes in the preferred embodiment that its message is redundant with the one to be transmitted by the digital receiver already controlling the FSL and therefore discards its message.

The arbitration performed by the FSL mechanism is, however, insufficient in the preferred embodiment PST trunking system to eliminate all collisions on the BSL. This is because it is possible in the GE PST trunking system that, due to the synchronized "slotted" nature of all incoming RF messages from mobile/portable transceivers, several digital receivers will successfully seize the FSL at about the same time. Thus, in this environment successful seizure of the FSL does not guarantee exclusive access to the BSL. Accordingly, a further mechanism is used to prevent BSL collisions and remove further redundant messages.

Briefly, this further mechanism in the preferred embodiment involves assigning a unique "start transmission" time window to each digital receiver contending for the BSL. Each digital receiver which has successfully seized the FSL times a duration unique to it beginning from the time it seized the FSL. During this duration, the digital receiver "listens" on the BSL for the start of transmission of a digital receiver having an "earlier" window assignment. If no start of transmission is detected by the time the digital receiver's unique delay time has elapsed, the digital receiver begins to transmit its message on the BSL. Digital receivers with "later" window assignments will detect this transmission, abort their own attempts to transmit on the BSL, and discard those messages—thus preventing message collisions on the BSL.

BRIEF DESCRIPTION OF THE DRAWINGS

These and other features and advantages of the present invention will be better understood and more completely understood by studying the following detailed description of the presently preferred exemplary embodiments in conjunction with the FIGURES, of which:

FIG. 1 is a schematic block diagram of a prior art digital voter system;

FIGS. 1A and 1B are schematic block diagrams of a prior art PST RF trunking system to which the digital voter system of the preferred embodiment of the present invention is particularly applicable;

FIG. 2 is a schematic block diagram of the presently preferred exemplary embodiment digital voter system in accordance with the present invention;

FIGS. 7A, 7B, 8, 9, 10A and 10B are schematic flow diagrams of exemplary program control steps performed by the digital voter system shown in FIG. 2.

DETAILED DESCRIPTION OF A PRESENTLY PREFERRED EXEMPLARY EMBODIMENT

Figure 1A:
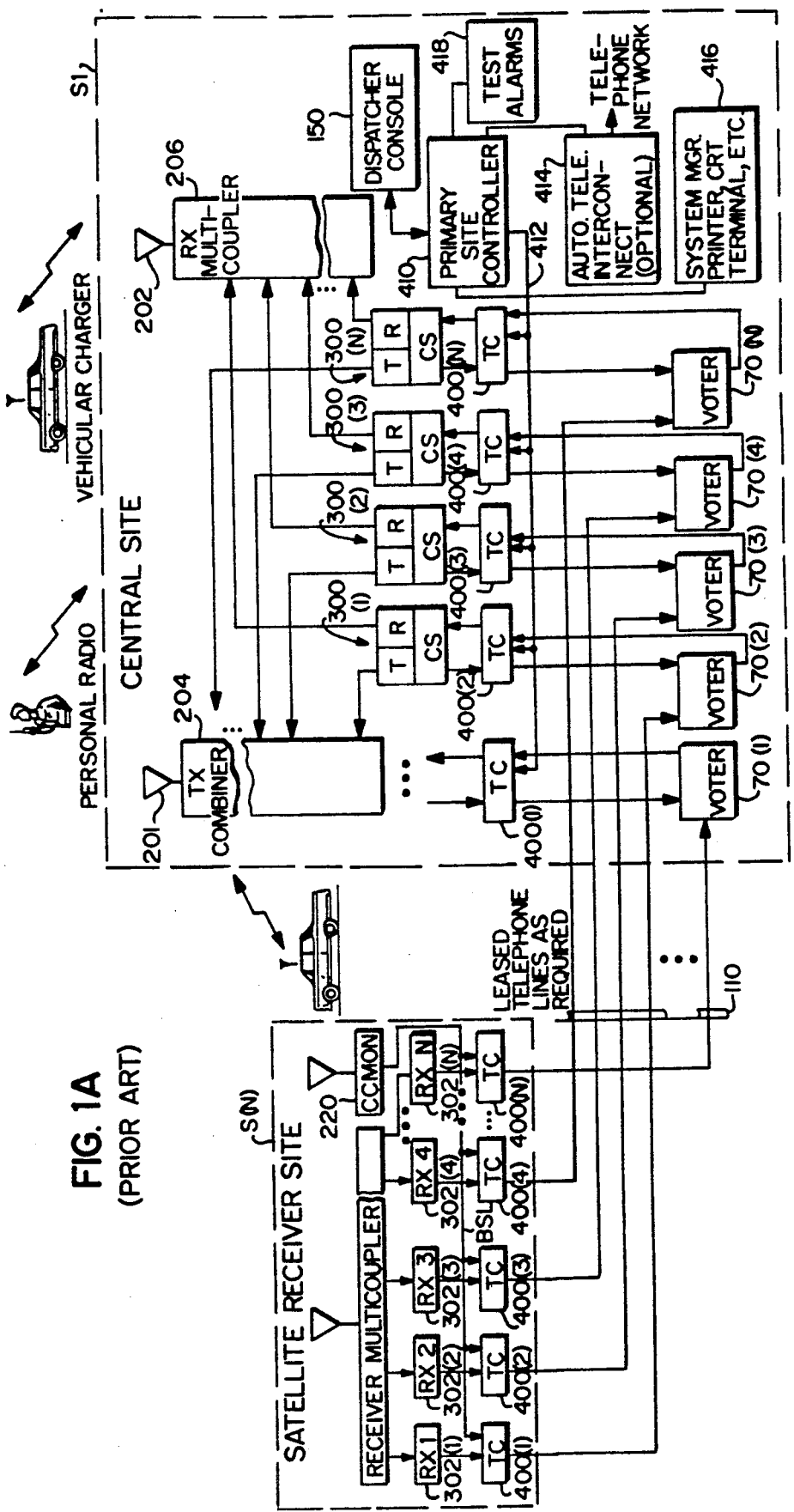

FIGS. 1A and 1B are schematic block diagrams of a prior art digital RF trunking system in which the digital voter of the present invention may be used with particular advantage. The digital RF trunking system shown in FIGS. 1 and 1B is the General Electric Company 16 PLUS Digitally Trunked Public Service Radio System. Referring to FIG. 1A, this system may include a central site S1, one or more satellite receiving sites S(2)-S(N), and a central dispatch console "station" (shown in FIG. 1A as part of main site S1 but typically located elswhere). As will be appreciated, satellite receiving sites S(2)-S(N) (only one of which is shown in FIG. 1A, but an arbitrary number of which may be provided) are displaced spatially from the central site S1 such that radio reception of a particular RF transmission may temporarily be better at one than the other of the satellite receiving sites. Received signals from the satellite sites S2-SN as well as signals received by the main site S1 are combined by voter circuits 70 so as to select an acceptable signal for control or communication processing.

At the main site S1, a transmitting antenna 201 and a receiving antenna 202 (which may be a common antenna structure) may be utilized with conventional signal combining/de-combining circuits 204,206 as will be apparent to those in the art. Transmitting and receiving RF antenna circuitry 201-206 are connected to a plurality of duplex RF channel/receive circuits included in a plurality of RF repeater stations 300(1)-300(24). Typically, there may be as many as 24 such stations for 24 corresponding RF duplex channels (including a control channel). Each station transmitter and receiver circuitry is typically controlled by a dedicated control shelf CS (e.g., a microprocessor-based control circuit) as is also generally depicted in FIG. 1A. Such control shelf logic circuits associated with each station are, in turn, controlled by "trunking cards" TC (e.g., further microprocessor-based logic control circuits) 400(1)-400(24).

Trunking cards 400 communicate with one another and/or with a primary site controller 410 via control data bus 412. The primary site control may be a commercially available general purpose processor such as a DEC PDP-11/73 or the like. Although the major "intelligence" and control capabilities for the entire system resides in controller 410, alternate backup "failsoft" control functions are incorporated in the trunking cards 400 so as to provide continued trunked repeater service even in the event that controller 410 malfunctions or is otherwise taken out of service.

The voters 70 are connected so as to receive a plurality of input digital and/or analog signals and to selectively output therefrom an acceptable (e.g., the strongest and/or most reliable) one of the input signals. In the preferred embodiment, a voter 70 is provided for each RF channel operating on the trunking system. Thus, signals received on exemplary RF duplex channels 1–24 by main site S1 are input to respective ones of voters 70(1)–70(24), while additional similar input signals are generated from satellite receiver sites S(2)–S(N) (each of which also receive on exemplary channels 1–24) are also input to the appropriate respective voters 70(1)–70(24). The results of the voting process performed by voters 70 are then passed to respective main site trunking card circuits 400(1)–400(24) where there are further processed as valid "received" signals.

As mentioned above, one of the 24 duplex RF channels supported by the FIG. 1A system is assigned to be a control channel. Digital control information (e.g., channel assignments and the like) is transmitted by the main site S1 on the "outbound" frequency of this duplex control channel, and further digital control information (e.g., channel assigment requests) is transmitted on the inbound control channel frequency by mobile/portable transceivers. In the preferred embodiment FIG. 1A system, all mobile/portable transceivers monitor the outbound control channel signal stream transmitted by main site S1 when they are not actually engaged in ongoing communications on another channel (a "working channel"). Under the direction of control signals transmitted by main site S1 over the outbound control channel, certain individual or groups of mobile/portable transceivers may be directed to a working channel to communicate with other mobile/portable transceivers, the dispatcher and/or a landline caller. When the communications terminates on the working channel, the mobile/portable transceiver(s) return to monitoring the control channel.

In the FIG. 1A system, all communications across all channels are synchronized with the signal stream on the outbound control channel. The trunking card 400 assigned as the main site S1 control channel trunking card generates synchronizing signals defining 30 ms "slots", transmits these synchronizing signals over the outbound control channel frequency, and also applies these synchronizing signals to the other trunking cards 400 (as will be explained shortly). All mobile/portable transceivers synchronize with the outbound control channel sync signals while they are monitoring the outbound control channel. The mobile/portable transceivers then transmit messages on the inbound control channel frequency within inbound "slots" defined by the outbound control channel synchronizing signals. Each message is transmitted within a single "slot" and is always transmitted beginning at a slot or frame "edge" defined by the outbound control channel sync signals transmitted by the main site S1.

In the FIG. 1A system, the control channel handles only digital messages, but the working channels are each capable of handling various types of signals including digital signals, analog "clear voice" signals, and digitized encrypted voice signals (Voice Guard). To increase flexibility, the FIG. 1A system can operate any of its exemplary 24 RF channels as a control channel (so that, for example, if the "control channel" hardware fails any working channel can become the control channel to replace the failed hardware). This means, of course, that each of voters 70 must be capable of processing both analog and digital signals, and that each of the voters must also be capable of performing any special processing of digital signals required for the control channel.

A slightly more detailed view of main site S1 shown in prior art FIG. 1B. Here it will be seen that a backup serial link (BSL) and a synchronization line (FSL) connect all of trunking cards 400. The FSL line is used to convey the control channel synchronization signals to all of the trunking card modules (and is typically driven by the single trunking cards 400 assigned as the control channel trunking card). The backup serial link BSL carries data in serial form between the trunking cards (e.g., when the system is operating in "fail soft" mode due to failure of the site controller 410). More details concerning the interaction between the trunking cards via the FSL and BSL lines may be found, for example, in commonly assigned copending application Ser. No. 07/057,046 filed Jun. 3, 1987 (which application is hereby incorporated by reference herein).

As described previously, the main function of satellite receiving sites S2–SN is to receive and validate inbound messages and pass them along to digital voter 100 so duplicate messages can be discarded. Referring once again to FIG. 1A, it L can be seen that the architectures of the satellite receiving sites S2–SN are very similar to that of the main site S1. Specifically, each satellite receiving site includes RF receivers 302(1)–302(N) (no transmitters are provided because the satellite receiving site has no transmit capability) and associated trunking cards 400(1)–400(N). In the preferred embodiment, a control channel monitor 220 located at each received site S2–SN continuously listens to the outbound control channel transmissions of main site S1. This control channel monitor 220 receives and validates the slotted outbound control channel messages, strips off the dotting, Barker, and repeats, and sends the messages through a buffer onto a backup serial link (BSL) of the type described, for example, in copending commonly assigned application Ser. No. 07/056,046 cited above. The BSL thus synchronizes all trunking cards 400 located at the satellite site with the main site S1 outbound control channel. To preserve slot timing, the two 28-bit control channel messages typically found in an outbound control channel slot are concatenated and sent sequentially in the form of two 4-byte messages every 30 milliseconds (the filler nibble used to complete the fourth byte contains a bit indicating slot position). One of the trunking cards 400 located in each satellite receiving sites S2–SN is designated as the control channel and uses the reception of the first byte on the BSL as a timing reference for inbound control channel messages (and thus can synchronously receive those inbound control channel messages with reduced falsing rate). The control channel monitor also provides operating mode status and—in working channel mode—call type information (i.e., clear voice, Voice Guard, etc.).

FIG. 2 is a high level schematic block diagram of a presently preferred exemplary embodiment of a voter system 70 in accordance with the present invention. As mentioned above, the purpose of voter system 70 is to equalize talk-out and talk-in range of hand held (or other low power) transceivers. Typical base station transmitters have power outputs that exceed a hand held transceiver output by over 20 dB. If hand held and mobile transceivers are to have equal coverages (which is a requirement for most public service systems and for other systems as well), a number of geographically dispersed satellite receiving stations is needed. Some existing systems have over forty satellite receiving sites. Voter systems 70 provide the mechanism for selecting one acceptable version of redundant signals received by main site S1 and the various satellite sites S2–SN and for passing the selected signal to main site S1 for further processing.

The voter system 70 shown in FIG. 2 provides voting functions for a single RF channel of the trunked radio repeater system (thus, there are typically multiple such FIG. 2 voter systems—one for each channel in the system).

Voter system 70 shown in FIG. 2 includes a digital voter 100 and an analog voter 200. The digital voter 100 votes on digital messages received from main site S1 and satellite sites S2–SN, discards redundant messages, and passes on only a single version of each digital message to main site S1 for further processing. Analog voter 200 votes on analog (clear voice) signals provided by main site S1 and satellite sites S2–SN, selects the "best" (e.g., most reliable or highest quality) signal, and passes the selected signal to main site S1 for repeating over a working channel.

While each voter 70 must be capable of processing both analog and digital signals in the preferred embodiment, analog and digital signals need not be processed simultaneously because they are not generally passed over the RF channels simultaneously. That is, during clear voice (analog) transmission, mobile/portable transceivers do not generally transmit digital messages requiring handling by voters 70. Accordingly, in the preferred embodiment only a single communications link 110 is provided for each channel between each radio site and each voter. That is, a telephone line communications link 110(1) connects voter 70(1) to for example a given main site working channel A trunking card, a telephone line communications link 110(2) connects the satellite receiving site S2 working channel A trunking card to voter 70(1), etc. Similarly, voter 70(2) processing signals for channel B will have a corresponding array of telephone line links 110 connecting it to the main site channel A trunking card and to each satellite site trunking cards for channel B.

Each of these telephone line links 110 is multiplexed between analog and digital information carrying capability in the preferred embodiment—since voice and data communications do not occur simultaneously. To accomplish this multiplexing (and also to be compatible with Voice Guard signalling), 3002 grade telephone lines are used for links 110. In standard applications, conventional Rockwell 9600 baud fast trained modems are used at each end of the telephone lines 110, and tones are used to switch the links between analog signal and digital signal modes. These modems train within 50 ms and in the preferred embodiment are kept trained during channel inactivity so that the training time does not add to system latency under most conditions.

The preferred embodiment voter system 70 shown in FIG. 2 handles all of the call types currently handled by the GE PST system, including:
  Clear Voice;
  Special Calls;
  Voice Guard; and
  Data.

Briefly, the clear voice mode of communications involves the transmission of conventional analog FM voice-modulated RF signals preceded by digital signals used to establish a channel assignment and followed by certain digital signals used to terminate a channel assignment. Special call signalling involves passing digital data blocks (e.g., representing a telephone number) followed by transmitting clear voice. Voice guard signalling involves transmitting encrypted digital voice signals. Data transmission mode involves transmitting blocks of digital data (e.g., from a mobile data terminal or the like).

As described above, digital voter 100 operates in conjunction with conventional analog voter 200. In the clear voice mode, each of the voice channel outputs is routed to the centrally located conventional analog voter 200, and this analog voter continuously selects the best received signal and routes the best signal to the main site S1. In the preferred embodiment, digital voter system 100 enables/disables analog voter inputs corresponding to different sites and then permits the analog voter to "vote" on the analog signals inputted to it (this analog voting is performed on the basis of RSSI, for example, in a conventional manner well known to those skilled in this art).

Special call signalling involves passing data blocks over the working channel (as described above) until main site S1 has a valid copy of each block—at which point the call enters the clear voice mode and the analog voter 200 takes over. This mode may be used, for example, to permit dialing of a landline telephone number prior to transmitting clear voice to the landline party. Hence, digital voter 100 in the preferred embodiment is involved in special call signalling—just as it is involved in the initiation of a clear voice communication—but then terminates its involvement as soon as clear voice is being transmitted over the communications channel.

Voice guard (encrypted voice) is handled in the preferred embodiment by digital voter 100, with the voter voting on different versions of received encrypted voice signals on the basis of least bit error rate (BER). In the data mode, digital data is simply routed through digital voter 100 with no relative quality voting occurring. In the case of the data mode, the voting performed by digital voter 100 in the preferred embodiment could be called "absolute" voting, since the voter simply recognizes the valid messages, eliminates duplicate (redundant) messages, and relays the valid messages to the main site S1 to be serviced.

As mentioned above, digital voter 100 for a given channel provides a corresponding digital receiver 104 for every receiver site S1–SN. In a trunked RF communications system, digital messages associated with clear voice, special call signalling, data and "system idle" messages (which will be explained shortly) all contain error checking bits (CRC). These error checking bits make it possible for the receiving site to determine if it has received a message without errors (and in some cases to actually correct errors in transmission). For non-Voice Guard messages, the preferred embodiment receiving sites S1–SN report to their corresponding voter digital receivers 104 only those received messages which do not contain bit errors. Therefore, digital voter 100 in the preferred embodiment does not (as least for non Voice Guard transmissions) decide which digital receiver 104 has the "best" message—since all digital receivers 104 receiving a message are already guaranteed of having received a version of the message containing no bit errors (and it doesn't matter which of these received messages selector 102 selects). Rather, in the preferred embodiment digital voter 100 operates on essentially a "first come first served" (FIFO) basis to relay only one copy of a particular valid message to the main site S1 via digital selector 102. This message selection process is accomplished in the preferred embodiment using a service request protocol which will be explained shortly.

It can thus be seen that the principal function of digital voter 100 is to receive messages from receiving sites S1–SN, select only (any) one version of redundant digital receiver outputs, and relay the selected output to main site S1.

When passing messages associated with clear voice and special call signalling, digital selector 102 checks the messages for redundancy and discards repeated messages. No such redundancy check is used for digital data type messages in the preferred embodiment.

In the preferred embodiment, receiving sites S1–SN send "idle" digital messages to digital voter 100 periodically when they have not received RF signals and therefore have no substantive digital messages to send to the digital receivers (one of the purposes of these idle messages is to prevent the synchronous Rockwell modems from losing synchronization with corresponding modems at the receiver sites, and another purpose of the idle messages is to permit main site S1 to confirm that remote receiver sites are still active and operating). Such idle messages are passed on from digital voter 100 to main site S1 whenever voter 100 is not busy transmitting a more important message (if the digital voter is busy, the idle message transmission is disabled in the preferred embodiment).

In a voted RF communications trunking system including digital voter 100 shown in FIG. 2, main site S1 not only receives the voted output of digital voter 100, but also submits messages it has received locally for voting by the digital voter. However, in the preferred embodiment the main site S1 may in some modes act on locally received messages without waiting for voter output (e.g., in order to reduce system latency) and thus only use the voter output to supplement its own locally received messages. In the preferred embodiment, inbound working channel messages received by main site S1 are passed on to digital voter 100 (via communications link 110(1) to digital receiver 104(1)), and messages coming back from the voter are treated as though they are received locally by main site S1. However, in the preferred embodiment, inbound control channel messages are not passed on to digital voter 100 but instead are acted upon immediately by main site S1. By acting on locally received control channel messages immediately rather than waiting on voter 100, latency is decreased and single site operation is fully automatic in the event of a voter or communication line failure.

Thus, in control channel mode digital voter 100 does not vote on the messages received by main site S1—so that main site S1 must provide an additional layer of voting with respect to the control channel messages provided to it by the digital voter. To provide this additional layer of voting, main site S1 in the preferred embodiment compares control channel messages received from digital voter 100 with control channel messages the main site itself previously received. In this control channel mode, main site S1 operates as a single site, acts upon its own locally received messages, and accepts voter messages only when it has an empty slot to fill. Main site S1 compares all control channel messages relayed to it by digital voter 100 with the last three slots worth of locally received messages (that is, all control channel messages locally received within the last 90 ms) in the preferred embodiment, and discards duplicate messages from the voter. Hence, if messages relayed to digital voter 100 are not provided to main site S1 within ninety milliseconds in the preferred embodiment, duplicate control channel messages could be transmitted by the main site. It is thus important for digital voter 100 to very rapidly handle messages applied to it.

Satellite site control channel receivers/trunking cards are responsible for relaying received RF messages to digital voter 100. Channel assignment and site ID signals received by the satellite site control channel monitor 220 are also relayed to digital voter 100. Satellite receiver site control channel monitor 220 monitors the outbound control channel messages and searches for the corresponding received responsive inbound RF message from the mobiles/portables. When the expected signal is detected, the message and associated voice audio (digital or analog) is relayed to digital voter 100.

In the preferred embodiment, digital voter 100 also actually provides certain messages to the satellite receiver sites S2–SN. In the preferred embodiment, whenever a channel is dropped, digital voter 100 is responsible for echoing that drop channel signal to all satellite receiver sites S2–SN. These echoed drop channel messages provide the satellite sites S2–SN with the means of knowing when a channel is dropped—information which is important for controlling site ID collisions at the digital voter 100 and for allowing the satellite site-digital telephone line modem to remain "trained" in between calls (thus reducing system latency).

In the preferred embodiment, digital voter 100 also has the task of controlling analog voter 200 inputs and outputs. Analog voter 200 in the preferred embodiment is of entirely conventional design, votes on the analog signals applied to its input, selects the signal having the best quality, and outputs that selected signal. In the preferred embodiment, all clear voice (analog) signals are preceded by digital signals, and digital receivers 104 within digital voter 100 are the components in the system which enable/disable (unsquelch/squelch) the inputs of analog voter 200. In particular, digital receiver 104(1) enables the input from communication link 110(1) (from main site S1) to the analog voter 200 in the preferred embodiment, digital receiver 104(2) enables the input from communication link 110(2) (i.e., from satellite receiving site S2) to the analog voter, etc. Similarly, selector 102 is charged with the responsibility for muting/unmuting the output of analog voter 200 in order to prevent data from being repeated by the main site S1 as clear voice analog signals. Thus, during all types of calls, digital selector 102 must control the conventional analog voter 200 appropriately. For example, digital selector 102 in the preferred embodiment detects whenever the analog voter 200 responds to lack of carrier on all of its inputs and then mutes the analog voter output and synthesizes an unkey message to be passed on to main site S1. Likewise, if a valid message requiring clear audio is received by digital selector 102, the digital selector passes on the valid message and then unmutes the analog voter output.

As mentioned above, in the preferred embodiment digital voter 100 detects and generates audio tones in addition to passing along digital messages in order to effect multiplexing of communications links 110 between analog and digital mode (and also to provide proper modem training synchronization). For example, before digital selector 102 sends a digital message to main site S1, it typically applies a 2918 Hz tone to communications link 112. Upon receiving this tone, the main site S1 switches back to local repeat mode and mutes the audio. Since a digital message on communications line 112 follows, this tone prevents modem data from being transmitted by main site S1 as part of a clear transmission. Similarly, main site S1 applies its own 2918 Hz tone to communications link 110 (1) whenever it is to send a digital message to its associated digital receiver 104(1). Upon receiving this tone, digital receiver 104(1) squelches the corresponding main site input of analog voter 200 s that digital data is not applied to the analog voter.

Each satellite receiver site S2-SN also controls two tones which are inserted onto the telephone line communication links 110 connecting the satellite receiver sites to voter 70. The satellite sites S2-SN applies a 2918 Hz tone to its telephone line 110 whenever it is desired to cause digital voter 100 to squelch the associated channel analog voter 200. The satellite site applies a 1950 Hz tone onto the telephone line 110 whenever the satellite site loses carrier or fails to detect low speed data during an ongoing call before an "unkey" or or channel crop message is detected. This 1950 Hz tone causes the digital receiver 104 to mute the analog voter 200 input. The tone is removed if carrier and low speed data are detected before the channel has been dropped—in which case the audio is patched through (or the next digital message is sent through digital voter 100, as appropriate).

In the preferred embodiment, the Rockwell modems are initially trained by first applying 30 ms of 2918 Hz tone signals to indicate that modem training is about to begin. This tone allows the audio path to be muted by analog voter 200 so that the training sequence and the message that follows are not transmitted as audio. This tone is followed by 20 ms of quiet line time (which is required by the modem prior to training). Finally, the 50 ms training sequence generated by the Rockwell modem itself is sent. However, during periods of inactivity on any particular communications line 110, system idle messages (i.e., site IDs) are sent periodically in the preferred embodiment with continuous dotting in between the idle messages. The protocol in the preferred embodiment for all telephone messages is as follows: 7 bytes of dotting followed by 2 sync bytes (57H, 12H) for word sync; followed by a message type byte followed by the message to be sent. These idle messages keep the modems trained, are also voted upon by digital voter 100 and passed on to main site S1, and in the preferred embodiment are used to signify change in control channel/working channel mode (i.e., to cause a digital voter formerly processing working channel traffic to begin processing control channel traffic or vice versa). The idle messages do present a problem in redundancy removal, however, because they can occur at the same time as a "real" message received from a mobile/portable and the digital voter 100 might select the idle message instead of the more important received message. Accordingly, as will be discussed shortly, in the preferred embodiment digital voter 100 disables idle message voting whenever a channel has been assigned.

VOTING BY DIGITAL VOTER 100

Now that the overall functionality of digital voter 100 and the environment in which the voter operates have been discussed, a description of how the digital voter votes on received messages in order to avoid message collision, eliminate redundant messages, and still minimize system latency will be presented.

As can be seen in FIG. 2, digital voter 100 includes digital selector 102, plural digital receivers 104(a)-104(N) corresponding to and associated with receiving sites S1-SN, a backup serial link 106, and a sync line (FSL) 108. The digital receivers 104 transmit data to selector 102 over the BSL 106 (and selector 102 in the preferred embodiment sometimes transmits data to the digital receivers over this link). The FSL 108 is used to help avoid collisions on the BSL 106 and for redundancy removal—as will be explained in much greater detail shortly.

Thus, backup serial link (BSL) 106 and the sync line (FLS) 108 are used for communicating information between digital selector 102 and digital receivers 104. While this dual bus architecture is similar to that used in the main site and satellite site architectures (see prior art FIGS. 1A and 1B), the actual functions performed by BSL 106 and FSL 108 within digital voter 100 are very different from the functions corresponding counterparts of these buses performed within the site architectures as will become apparent shortly.

In the preferred embodiment, the FSL line 108 within digital voter 100 is used by digital receivers 104 as a "service request" line to determine whether BSL 106 is in use. Thus, FSL 108 is monitored by and can be controlled by each (every) one of digital receivers 104. FSL 108 in the preferred embodiment of digital voter 100 may be thought of the "first line of defense" for avoiding collisions on BSL 106 and for removing redundant messages.

Briefly, when a digital receiver 104 has received a message to be passed to digital selector 102, it first checks the state of FSL 108. Only a digital receiver 104 which discovers the FSL 108 is inactive and then seizes control over the FSL is permitted to transmit data on the BSL 106. If FSL 108 is active (indicating the BSL is in use) when the digital receiver 104 tests its state, the digital receiver 104 assumes that its own message is redundant and immediately discards this message. When a digital receiver 104 gains control of FSL 108, it seizes the FSL by changing the state of the FSL line (e.g., by "pulling down" the level of the line to an active logic low level). Changing the state of the FSL 108 alerts all other digital receivers 104 (and digital selector 102) that the BSL 106 is in use. The seizing digital receiver 104 keeps the FSL in the active low state for a preset duration (corresponding to the voter "redundancy removal" period, as will be explained). Any other digital receivers 104 receiving messages during this redundancy removal period simply discard their messages—thus minimizing data collision on the BSL 106 and also effecting removal of redundant messages.

Figure 3:
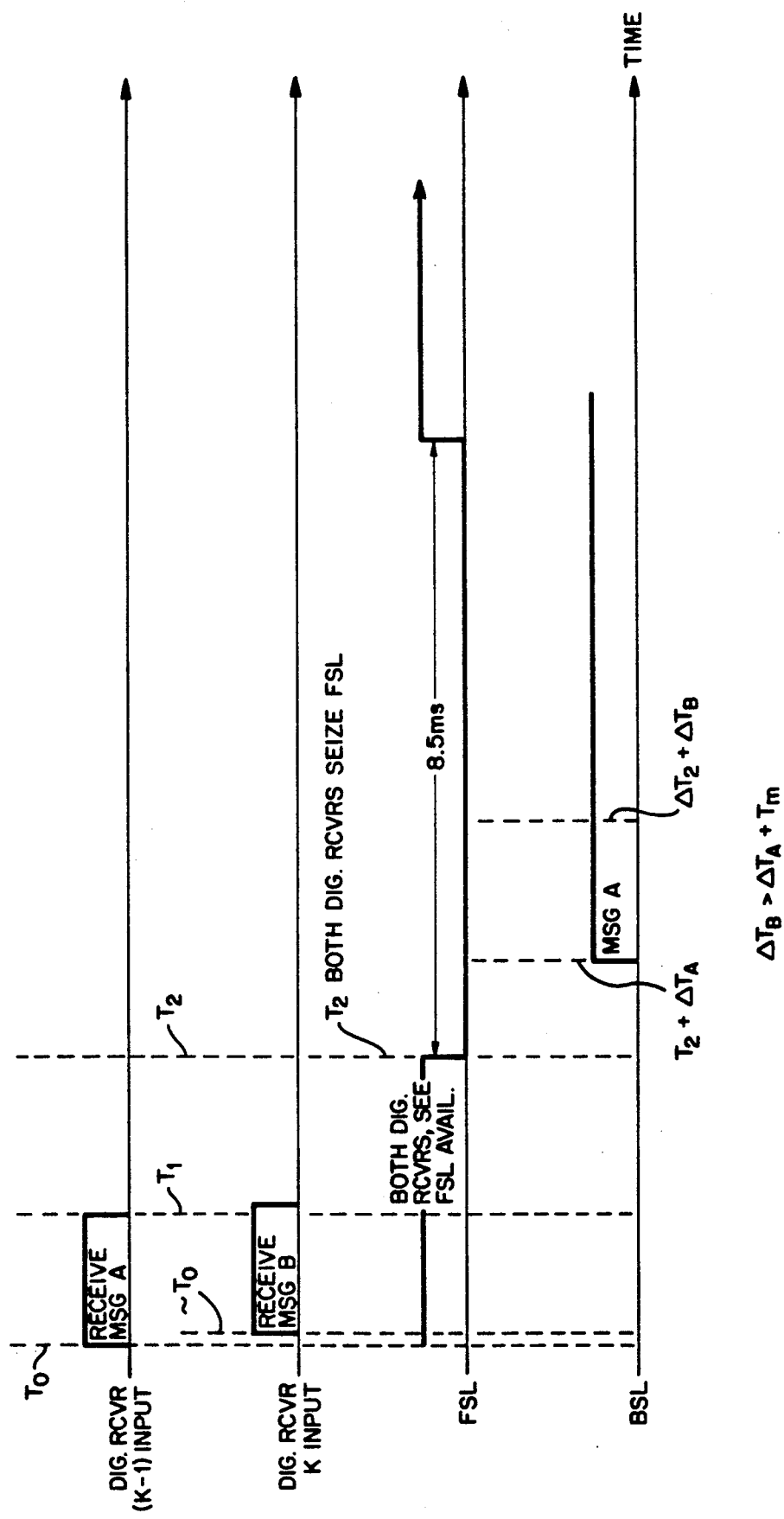
FIGS. 3–6 are graphical timing diagrams of signals present in the FIG. 2 digital voter system.

Referring now to FIG. 3, suppose satellite receiver site S(k−1) and another satellite receiving site S(k) each receive the same digital RF message on a given working channel at substantially the same time (any slight variations in the time of reception are attributable to differences in RF path lengths between the transmitting station and the two satellite receiving sites). Each of satellite receiving sites S(k−1) and S(k) immediately transmit their received messages A and B, respectively, to their associated voter digital receivers 104(k−1), 104(k). Suppose, then, that digital receiver 104(k−1) receives message A from satellite receiver site S(k−1) at time $T_O$ and that digital receiver 104(k) receives message B (message B being identical in content to message A) at approximate the same time $T_O$ (slight time variations attributable to unequal telephone line delays may be present, as will be explained shortly). As soon as both digital receivers 104(k−1) and 104(k) have received their associated messages A,B, they each look at FSL 108 to see if it has been seized (i.e., pulled low) by any other digital receiver 104. However, assuming no other digital receiver 104 has received an identical message shortly before, the FSL 108 will be inactive-high (indicating that BSL 106 is available), and both of digital receivers 104(k−1) and 104(k) detect by monitoring the FSL that the BSL is free. It takes each of the digital receivers 104(k−1), 104(k) about the same amount of time to detect that FSL 108 has not been seized—and both of these digital receivers then seize the FSL at about the same time $T_2$ (note that this last stated assumption is merely an approximation—a detailed analysis of the effect of time variations on this seizing process will be provided shortly). Both of digital receivers 104(k−1), 104(k) are now granted access to transmit the received messages over BSL 106. If both of these digital receivers 104(k−1) and 104(k) transmit their respective received messages A, B at the same time, the transmitted messages would collide on BSL 106 and in all likelihood would destroy one another. Thus, digital selector 102 would receive neither message.

Thus, in the preferred embodiment radio trunking system it is not only possible but highly probable (due to the "slotted" nature of the digital messaging it supports) that more than one digital receiver will attempt to access BSL 106 simultaneously—and thus that more than one digital receiver will seize FSL 108 without realizing that other digital receivers have also seized the FSL at the same time. Thus, in the preferred embodiment the FSL 108 can only reduce but not eliminate collisions on BSL 106—since a digital receiver 104 that has successfully seized the FSL is not guaranteed exclusive access to the BSL.

In accordance with an important aspect of the present invention, even though two digital receivers 104 are granted access to BSL 106 at approximately the same time, they do not begin transmitting data on the BSL at the same time. To eliminate data collisions on BSL 106 in the event that more than one digital receiver 104 has seized FSL 108, each digital receiver 104 in the preferred embodiment does not transmit its message immediately upon seizing FSL 108 but instead each waits a predetermined unique time period (i.e., the waiting period for each digital receivers is different) after it seizes the FSL before transmitting its message over BSL 106 to digital selector 102. During this waiting period, the digital receiver 104 closely monitors the BSL 106 for signals. If a digital receiver 104 detects a signal on BSL 106 during its waiting period, it aborts its attempt to transmit on the BSL and discards its message.

Referring again to FIG. 3, digital receiver 104(k−1) may begin transmitting at a time $T_2$+Delta $T_A$, for example, while digital receiver 104(k) may wish to begin transmitting at a time $T_2$+Delta $T_B$—where Delta $T_A$ does not equal Delta $T_B$. Thus, digital receiver 104(k−1) will be guaranteed to begin transmitting message A over BSL 106 before it is time for digital receiver 104(B) to begin to transmit its received message B.

If a digital receiver 104 (after seizing the FSL 108 and while it is waiting to transmit on BSL 106) detects a start bit on the BSL, that digital receiver discards its message and aborts its attempt to transmit over the BSL. Thus, in the FIG. 3 example, waiting digital receiver 104(k) will detect the start bit of message A transmitted on BSL 106 by digital receiver 104(k−1) prior to the time $T_2$+Delta $T_B$ and will thereupon abort its own transmission of message B. Only message A will be passed on to digital selector 102 (the redundant message B having been removed entirely from digital voter 100 and a data collision avoided).

As mentioned above, in the preferred embodiment, once a digital receiver 104 has pulled FSL line 108 low, it continues to pull the line low for a total duration of 8.5 ms in the preferred embodiment regardless of the Delta T value assigned to it (and regardless of whether or not it actually transmits its message on BSL 106 or instead aborts its transmission attempt in response to detection of a start bit on the BSL before its Delta T waiting period has elapsed). In some cases, such as when a digital receiver 104 receives a message indicating a data call is following, the digital receiver continues to seize FSL 108 for the duration of the entire data call transmission.

Figure 4:
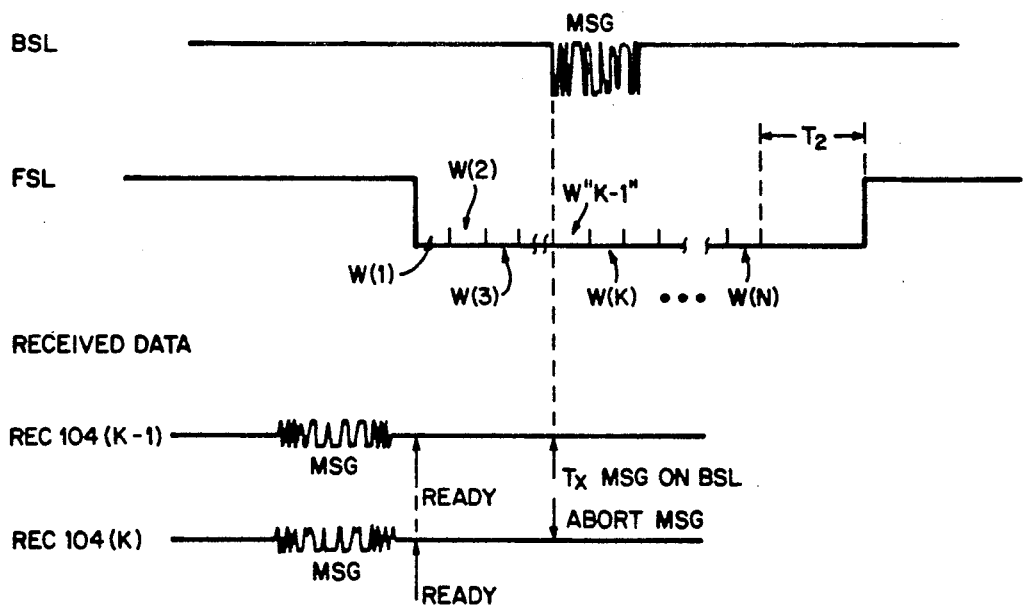

In the preferred embodiment, the Delta T associated with each digital receiver 104 is unique and is determined from a user-programmed value (i.e., a DIP switch setting). In the preferred embodiment, up to a maximum of 64 digital receivers 104 may be part of each digital voter 100 (thus accommodating a main site and 63 satellite receiving sites), with each digital receiver being assigned a different "channel number" from 0 to 63 (note that this "channel number" assignment does not correspond to RF channel, since all digital receivers within a given digital voter 100 will be handling traffic from the same RF channel). A 6-bit digital value may be used to code the digital receiver channel number, and each digital receiver is assigned a different channel number. This channel number value is used in the preferred embodiment for calculating the Delta T value associated with each digital receiver 104. Referring now to FIG. 4, it can be seen that the Delta T waiting time values for the various digital receivers 104 define a successive sequence of transmission start time "windows" within the 8.5 ms redundancy removal period (i.e., the seize time of FSL 108). These time windows W(1)-W(N) are sequential, successive, equal in duration, and adjacent to one another in time in the preferred embodiment, and are assigned to corresponding digital receivers 104(1)-104(N), respectively. After seizing the FSL 108, a digital receiver 104 may only begin transmitting on the BSL 106 during its assigned window. No transmissions begin within windows assigned to digital receivers 104 that have not seized FSL 108 during a given protocol exchange. As can be seen in FIG. 4, the actual duration of messages transmitted over BSL by a digital receiver 104 is, in the preferred embodiment, much longer than the duration of the transmitting window assigned to the digital receiver.

Thus, in the preferred embodiment a window defines a time duration in which the digital receiver 104 assigned to the window can begin transmitting on the BSL 106—and not (as in some systems) a time duration within which the assigned digital receiver has true exclusive access to the BSL. The windows do not define, for example, time slots of the type used in a conventional time division multiplexed digital frame structure, since in such TDM frame structures each time slot must have sufficient duration to "contain" an entire message from the node assigned to the slot. Since a given message transmitted on the BSL 106 typically occupies many windows in the preferred embodiment, as is shown in FIG. 4, many digital receivers can possibly transmit during a given window W(i)—but only one digital receiver 104(i) is authorized to begin to transmit during that time period.

The sequence of windows W thus establishes a predetermined sequence in which digital receivers 104 contending for access to BSL 106 may begin transmitting and ensures that no two digital receivers will ever attempt to begin transmitting at exactly the same time. Moreover (as will be explained in greater detail shortly), the durations of windows W in the preferred embodiment are long enough to ensure a sufficient minimum spacing (in time) between the instants at which different digital receivers can begin transmitting to allow any arbitrary digital receiver 104(k) scheduled to begin transmitting in assigned window W(k) sufficient time to abort transmission in response to detected start of transmission of the digital receiver 104(k−1) assigned to the immediately preceding window W(k−1).

Consider a manufacturing assembly line as a very simplified but somewhat illustrative analogy to the window protocol arrangement of the preferred embodiment. Picture a plurality of assembly line workers on a moving belt type assembly line. The moving belt conveys partially assembled machines. All of the assembly line workers in this particular part of the assembly line have the same task of installing a specific part (e.g., a bolt) into the machine. However, the belt moves too rapidly for a single worker to install a bolt into every machine that goes by. Instead, the workers space themselves linearly along the belt. If a machine without a bolt yet installed reaches a worker who is holding a bolt and is ready to install it, the worker installs the bolt into the machine (e.g., by walking along the assembly line with the machine until the bolt installation is complete). If the worker is not ready to install a bolt, however, he lets the machine pass him by and another worker further down the line installs the bolt. The workers space themselves apart along the assembly line (and thus arrange themselves into a predetermined sequence with respect to any given machine travelling down the line) so that the workers do not get into one another's way and so that two workers never try to install bolts into the same machine. By the time a machine reaches a particular worker, that worker always can easily determine whether or not he needs to install a bolt into that machine. Workers at the front of the assembly line will, if conscientious, install many more bolts than workers near the end of the line (since all or most machines that pass by the front workers need bolts). The very last worker on the line may only install a bolt very occasionally—his main job it to inspect every machine that leaves his area to make sure it has a bolt installed and to install bolts in the few machines that all of the other workers missed.

In a somewhat similar fashion, the sequence of windows in the preferred embodiment establishes an order in which digital receivers 104 may begin to transmit data over BSL 106. Once a digital receiver 104 earlier in the sequence begins to transmit, no digital receiver later in the sequence will attempt to transmit. Thus, no two digital receivers 104 will ever attempt to transmit on BSL 106 simultaneously—just as no two assembly line workers in the analogy discussed above will ever attempt to install bolts into the same machine—due to the predetermined sequence in which the digital receivers (assembly line workers) are arranged.

There are two critical time duration parameters relating to proper redundancy removal and collision avoidance on voter BSL 106 and to reduction of the contribution by the voter 100 to system latency: (a) the duration of the successive "windows" assigned to each of digital receivers 104; and (b) the duration over which a digital receiver 104 seizes FSL 108. These timing parameters will now be discussed in connection with FIGS. 4–6.

As shown in FIG. 4, the sequence of windows in the preferred embodiment do not occupy the entire 8.5 ms redundancy removal time duration (during which the FSL 108 is pulled low) but instead end a sufficient time prior to the expiration of this time duration so the remaining time $T_Z$ is long enough to permit digital receiver 104(N) (assigned to the last occurring window W(N)) to begin transmitting in that last occurring window and still complete its message transmission over BSL 106 before FSL 108 is released.

As can also be seen in FIG. 4, the time windows assigned to the digital receivers 104 in the preferred embodiment are very much shorter than the time it takes for a digital receiver to transfer a message to digital selector 102. In the preferred embodiment, the duration of the various time windows W is determined not by how long it takes for a digital message to be transferred over from digital receiver 104 to digital selector 102—but rather by the amount of time it takes for a digital receiver to detect the "start" bit of such a message being transferred over the BSL and to successfully abort its own transmission of a redundant message. However, the time duration of windows W must also take into account another factor—the inherent inaccuracy of detecting the transmission of the FSL 108 by digital receivers 104.

Redundancy removal relates to the effectiveness of digital voter 100 at discriminating between redundant and non-redundant messages. When a mobile or portable radio transceiver transmits a message, some or all of satellite receiving sites S(2)–S(N) may receive a version of the message and the main site S1 may also receive a version of the message. Redundant messages are thus all versions of a message having the same radio transceiver (portable or mobile) as their source. Redundancy removal in the preferred embodiment voter 100 is based on the assumption that all messages received by the receiving sites at the same instant in time (or within a given time frame accounting for RF path length differences) by all sites—all messages reported by those receiving sites to voter 100 within a "redundancy removal" time frame—have their origin in the same transmission by a single source radio. This assumption is not always absolutely correct, but in the preferred embodiment radio trunking system the assumption is workable or practical for the following reasons.

In the preferred embodiment RF trunking system, inbound control channel messages are "slotted" —meaning that they always begin upon the occurrence of a 30 ms frame edge. Since all mobile/portable transceivers synchronize to a common main site S1 outbound control channel in the preferred embodiment, all mobile/portable transceivers operating in the trunking system will "agree" (within time uncertainties attributable to unequal RF propagation delays) on when this common frame edge occurs. Two RF transceivers that are keyed at nearly the same time will thus transmit either at virtually exactly the same instant (each waits until the occurrence of the next control channel frame edge to occur before transmitting) or separated by a 30 ms "slot" (so that the two transceivers transmit in different slots altogether).

In the event that two geographically proximate transceivers send in the same slot, the resulting RF signal collision will typically result in destroying both transmissions and thus prevent any receiving site from correctly receiving either transmission. In this situation, neither transceiver will receive a responsive message from the main site S1 over the outbound control channel, and each will utilize a "random retry" technique to retransmit their respective messages while avoiding further RF collisions (see U.S. application Ser. No. 07/056,922 to Childress, referenced above).

If however, the two transceivers transmitting within the same slot are geographically separated from one another, it is likely that a satellite receiving site S(i) close to a first of the two transceivers will receive the transmission of that first transceiver while a further satellite receiving site S(j) close to the other transceiver will receive the transmission of the other transceiver. Satellite receiving sites S(i), S(j) will thus each report a valid message to voter 100 for that slot, and these two valid messages will arrive at voter 100 at about the same time. Voter 100 in the preferred embodiment erroneously assumes that the two messages it has received from satellite receiving sites S(i), S(j) are redundant versions of the same message, selects one of the messages, and discards the other. Thus, only one of the two messages will be relayed to main site S1 for response. This effect is similar to the destructive RF collision discussed above (which the transceivers overcome using a retry technique)—with the improvement that one of the two messages is in fact passed on by voter 100 to main site S1 (in the RF collision situation, both RF messages are corrupted and neither message typically "gets through").

Given the redundancy removal assumption discussed above and the slotted nature of inbound channels in the preferred embodiment, it will be evident that in the preferred embodiment there is a macro time relationship between all redundant versions of the same message reported to voter 100 from different sites. Once the maximum time difference in message delay between the sites (e.g., attributable to RF path length differences, differences in landline propagation delay from the sites to voter 100, and the like) is known, all messages arriving at the voter within this time difference can safely be assumed by voter 100 (given the assumption described above) to be redundant versions of the same message. Since in the preferred embodiment only "valid" messages will actually reach voter 100, any one of the messages received by voter 100 may be relayed by digital selector 102 to main site S1 and all other messages are discarded.

Figure 6:
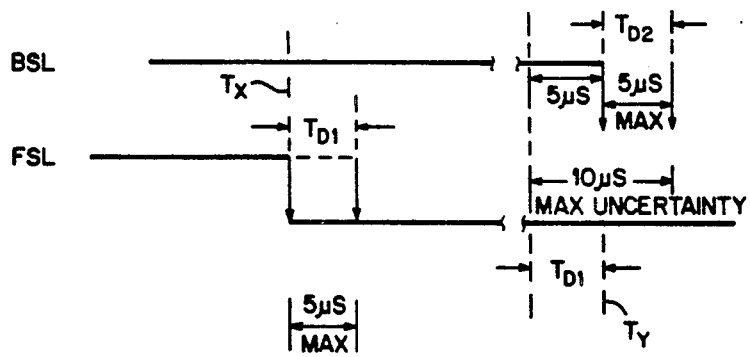

Even though all transmitting mobile/portable transceivers are extremely closely synchronized to one another because they all monitor a common outbound control channel synchronization stream, there are (as mentioned above) slight variations in the time it takes for two versions of the same RF message to propagate through different satellite receiving sites and through different telephone communications links 110 connecting the sites to the voter 100. FIG. 6 illustrates this phenomenon.

Figure 5:
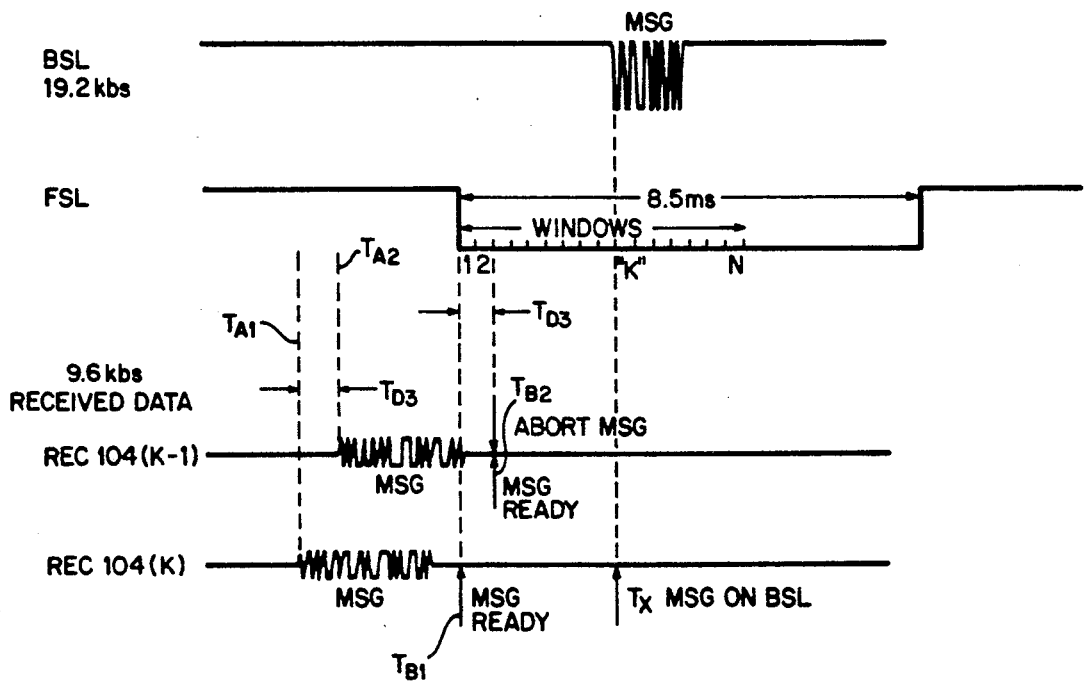

Referring now to FIG. 5, consider the arrival of two versions of the same RF message at digital receivers 104(k−1) and 104(k) at respective times $T_{A2}$ and $T_{A1}$ (where $T_{A2}$ is later than $T_{A1}$ by a worst case time difference $T_{D3}$). It takes digital receivers 104(k−1), 104(k) a certain amount of time to actually receive the messages, get the messages ready for transmitting over the BSL 106, and then seize the FSL 108. Assuming that each of the two digital receivers 104(k−1), 104(k) requires substantially the same amount of time to perform these tasks, digital receiver 104(k) seizes the FSL 108 at time $T_{B1}$ whereas digital receiver 104(k−1) is ready to seize the FSL at a later time $T_{B2}$ (where $T_{B2}$ is $T_{D3}$ seconds later than $T_{B1}$) In this situation, by the time digital receiver 104(k−1) is ready to attempt to seize FSL 108, digital receiver 104(k) has already seized the FSL (due to its earlier receipt of the redundant message)—and digital receiver 104(k−1) accordingly aborts its attempt to transmit on the BSL, assumes the message it has received is redundant with the message being transmitted by digital receiver 104(k−1), and discards the message.

In order for the redundancy removal process described above to be successful, it must be guaranteed that digital receiver 104(k−1) will continue to pull down FSL 108 during the time digital receiver 104(k) is testing the FSL. If digital receiver 104(k−1) has released FSL 108 sooner than time delay $T_{D3}$ after it seized the FSL, digital receiver 104(k) will find the FSL to be available and will therefore succeed in transmitting a redundant version of the same message. Assuming a predominant delay variable in this process is due to the difference in landline propagation delay and assuming a typical 85 microsecond per mile propagation delay and a 100 mile maximum geographical separation difference between satellite receiving sites S2-SN and voter 100, a time period of 8.5 milliseconds was chosen in the preferred embodiment for time of seizure of FSL 108. In the preferred embodiment, whenever a digital receiver 104 seizes the FSL 108, that digital receiver continues to seize FSL 108 for a duration of 8.5 milliseconds. This 8.5 millisecond duration is, in effect, the redundancy removal time of voter 100. That is, any two messages arriving at the voter 100 within 8.5 milliseconds of one another are assumed to be redundant messages and only one of the two messages is therefore selected by digital selector 102.

The maximum window duration is constrained by this 8.5 millisecond redundancy removal period in the preferred embodiment—and is also constrained by the maximum number of satellite receiving sites S. Specifically, the following relationship holds true in the preferred embodiment:

Redundancy period ≥ (max. number of sites) × (window duration)

In the preferred embodiment, the maximum number of sites is given as 64. With the redundancy period determined to be 8.5 ms, the maximum window duration is thus 8.5 ms/64 = 1.3 ms.

The minimum duration of the time windows shown in FIGS. 4 and 5 (and thus the "spacing" in time between the Delta T's of the different digital receivers 104(1)-104(N)) is directly effected by the inherent timing uncertainty of digital receivers 104 in detecting when the FSL 108 and the BSL 106 are active. This is because the window duration must be large enough to guarantee that BSL activity in the immediately preceding window will be successfully detected by each digital receiver 104 so that its own transmission of a redundant message onto the BSL is reliably aborted. Referring to FIG. 6, a timing diagram of pull-down of the FSL 108 and detection of signals on BSL 106, it can be seen that in the preferred embodiment the inherent inaccuracy provides a (conservatively rated) 10 microsecond maximum uncertainty and is attributable to two sources which are additive.

The first source of uncertainty is the time it takes for a digital receiver 104 to detect that the FSL 108 has been seized. Assuming the FSL 108 is seized by a first digital receiver 104(k) at time $T_x$, a delay $T_{D1}$ must elapse before all other digital receivers 104 detect the seizure of the FSL. If a further digital receiver 104(k−1) (e.g., typically wishing to transfer a redundant message to selector 102) tests the FSL 108 before this delay $T_{D1}$ has expired, it will determine that the FSL has not already been seized and will therefore also seize the FSL. In the preferred embodiment, this delay $T_{D1}$ has a maximum duration of about 5 microseconds. Because digital receivers 104 time their associated window delays Delta T from the time they seize the FSL 108 in the preferred embodiment, this $T_{D1}$ delay directly translates into an uncertainly as to when the time windows begin. That is, since different digital receivers 104 may seize the FSL 108 at slightly different times and decide window beginning times based on time of FSL seizure, they will not exactly agree on when a given time window begins. This may lead to problems if digital receivers 104 having adjacent window assignments both wish to transmit. To prevent this uncertainty from causing collisions on BSL 106, the minimum window duration must take the uncertainty into account.

The other uncertainty effecting minimum window size in the preferred embodiment is, as mentioned above, the time required by the digital receivers to detect activity on the BSL 106. As will be explained, this other uncertainty adds to the first uncertainty discussed above to limit the minimum time window size.

Referring again to FIG. 6, suppose that the window of the digital receiver 104(k−1) (i.e., the receiver that last seized the FSL 108) begins at time $T_Y$ (this $T_Y$ time is determined by the digital receiver 104(k−1) by adding its unique Delta T to the time $T_X + T_{D1}$ at which it seized FSL). Digital receiver 104(k) is the first digital receiver to seize FSL 108, but in this worst case analysis, it is also the digital receiver having a window assignment immediately succeeding the window assigned to digital receiver 104(k−1). Digital receiver 104(k) reckons (from the time $T_X$ at which it seized FSL 108) that the window for digital receiver 104(k−1) should have begun at time $T_Y - T_{D1}$. Moreover, digital receiver 104(k) requires a further finite time delay $T_{D2}$ beginning at time $T_Y$ (the time when digital receiver 104(k−1) actually begins transmitting on BSL 106) to detect the signals on the BSL and abort its own planned BSL transmission (in the preferred embodiment, this further time delay $T_{D2}$ for detection of BSL signals is estimated to also be a maximum of 5 microseconds).

Thus, the total uncertainty introduced by the FSL and BSL detections is additive (i.e., equal to $T_{D1} + T_{D2}$) Accordingly, the absolute minimum window duration in the preferred embodiment is $T_{D1} + T_{D2}$—that is, the sum of the maximum time required for a digital receiver 104 to detect seizure of FSL 108 and the maximum time required for a digital receiver to detect seizure of BSL 106.

Based on these various considerations, in the preferred embodiment the duration of windows W has been set at 100 microseconds. This duration provides a large margin for the timing uncertainties illustrated in FIG. 6 and is also consistent with the maximum number of sites and the redundancy removal consideration.

FIGS. 7A-10B are flowcharts of exemplary program control steps performed by digital voter 100 in the preferred embodiment when the digital voter operates in the "working channel" mode to implement the bus contention resolution/redundancy removal process described above. The following is a description of those exemplary program control steps.

Figure 7A:
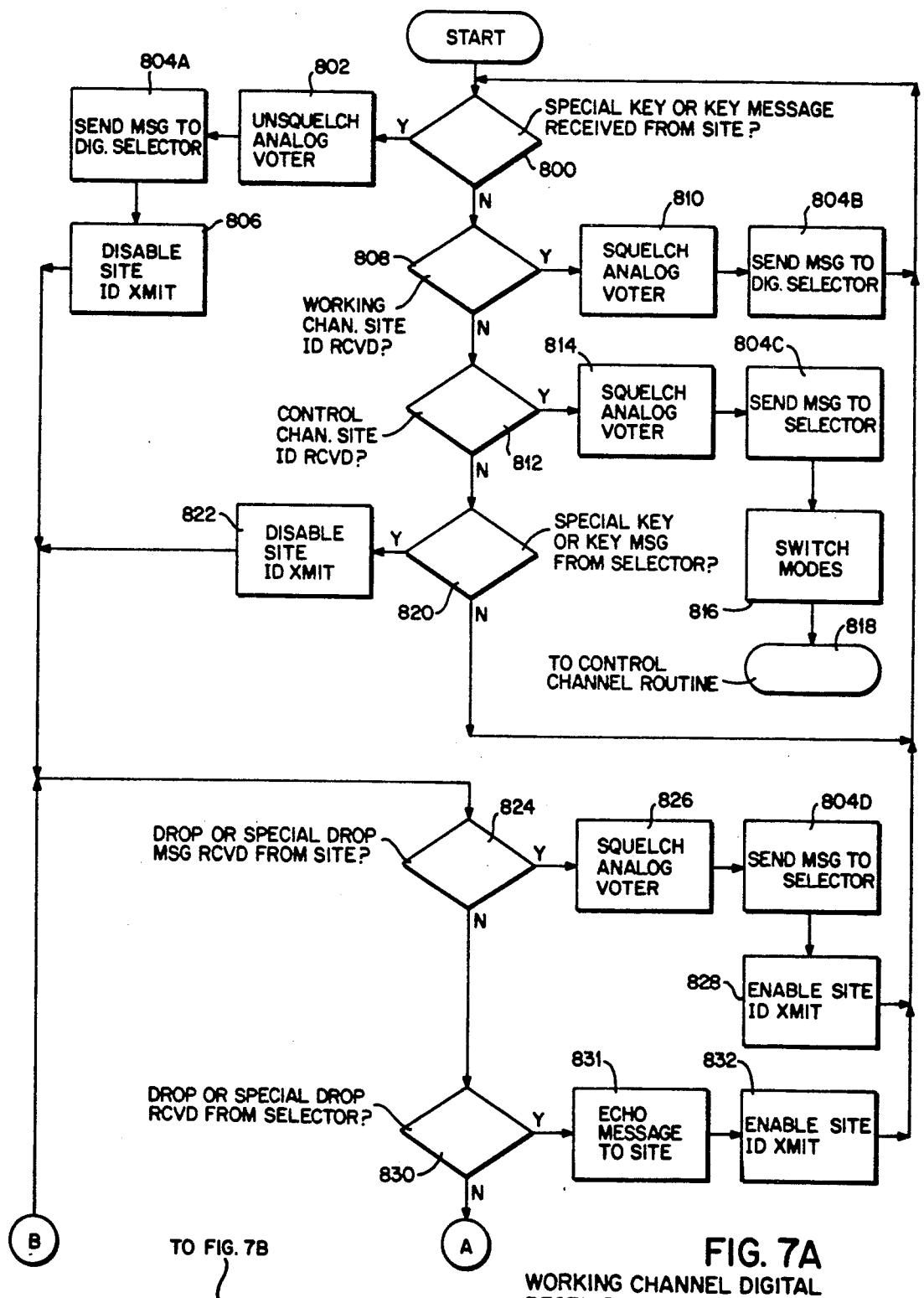
Figure 7B:
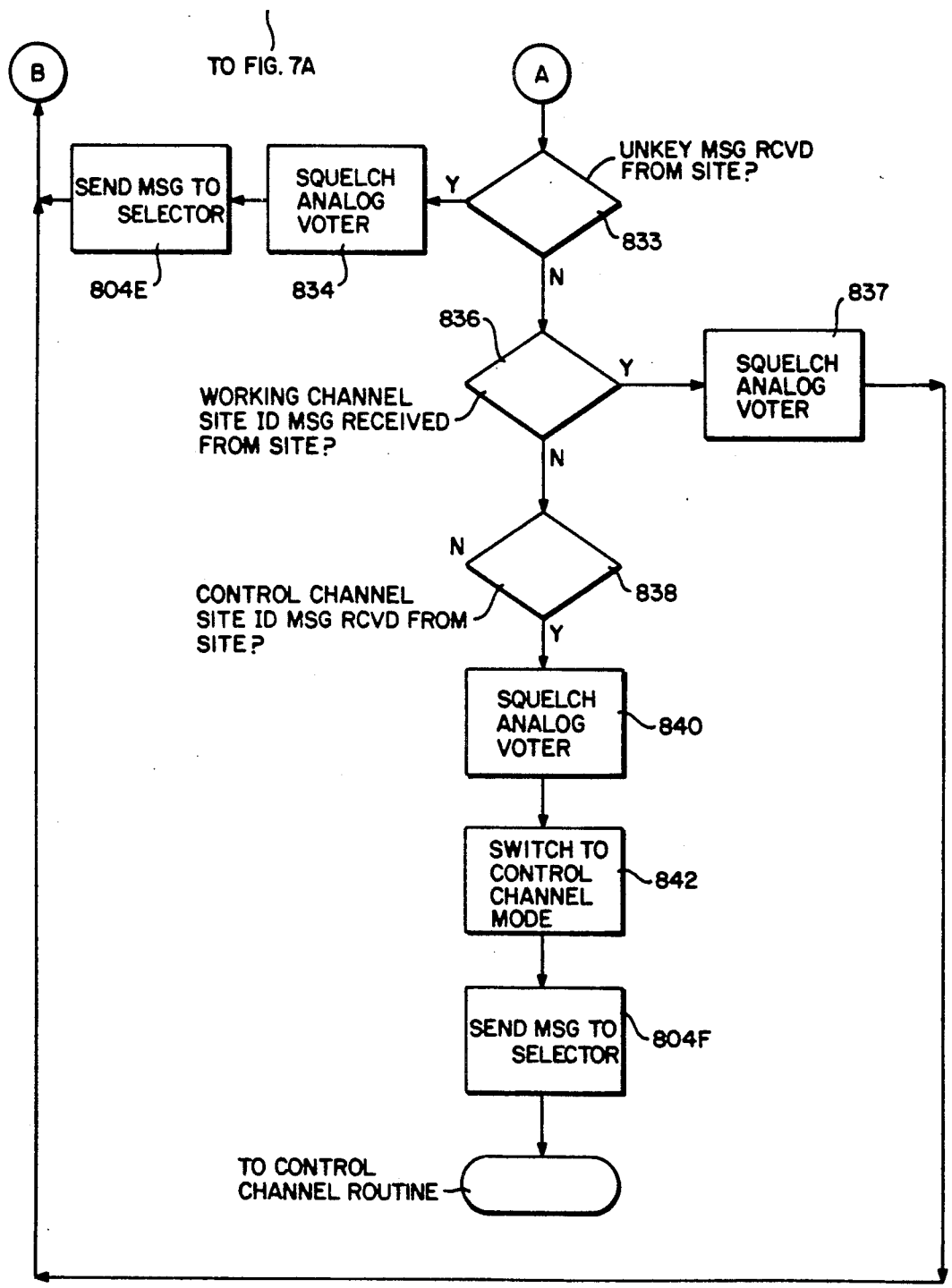

Each digital receiver 104 in the preferred embodiment has the architecture of a conventional trunking card 400 but has stored therein special program control code which provided the digital receiver functionality described above. FIGS. 7A-7B are together a flowchart of exemplary program control steps performed by a digital receiver 104 operating in the working channel mode. Digital receiver 104 operates in two states: a first state (corresponding to blocks 800-822) in which the digital receiver passes all messages it receives on to the selector 102; and a second state (corresponding to blocks 824 to 842) in which the digital receiver passes all received messages except for site ID messages to the selector.

At block 800 of FIG. 7A, digital receiver 104 determines whether it has received a key message (either "special key" or "key") from its associated site. If digital receiver 104 has received a key message, it unsquelches the analog voter input (block 802), attempts to send the received key message to the selector 102 over BSL 106 (block 804A), and disables transmission of any site ID messages it receives (since an ongoing call is in progress, it is undesirable to permit site ID messages to interfere with and possibly contend on the BSL with further messages associated with the call; block 806). Control is then transferred to "state 2" block 824. Similarly, if the digital receiver 104 receives an echoed "key" message from selector 102, site ID message transmission is disabled (block 822) and control is passed to block 824.

Decision block 824 tests whether a "drop" (e.g., special drop or drop) message has been received from the site. If a drop message has been received (indicating that the ongoing call is terminated), the digital receiver 104 squelches the analog voter input (block 826), sends the received drop message to the selector 102 (block 804D), and re-enables transmission of site ID messages before returning to "state 1" block 800. If, on the other hand, such a "drop" message is received from selector 102 (decision block 830), digital receiver 104 echoes the drop message to its associated site (block 831), enables site ID message transmission (block 832), and returns control to block 800. If no drop message has been received, digital receiver 104 tests whether it has received an "unkey" message from the site (decision block 833, FIG. 7B). If an unkey message from site has been received (indicating that the mobile or portable receiver has released the working channel), digital receiver 104 squelches the analog voter (block 834), sends the message to the selector 102 (block 804E), and waits for a drop message (decision block 824).

If a working channel site ID message arrives from the site during the time digital receiver 104 is waiting for a drop or unkey message (decision block 836), the digital receiver squelches the analog voter 200 (but does not pass the message on to selector 102) and returns control to decision block 824. Finally, if the site sends the digital receiver 104 a control channel site ID message (indicating that the RF channel associated with the digital receiver has become the system control channel, e.g., due to failure of a component associated with the previous control channel), the digital receiver must begin handling control channel rather than working channel traffic. In this case, digital receiver 104 squelches the analog voter 200 (no analog voting is required for the control channel; block 840), switches to the control channel mode (block 842), passes the control channel site ID message to the selector 102 (block 804F), and begins executing a control channel digital receiver routine in lieu of the working channel routine shown in FIGS. 7A-7B.

Referring once again to FIG. 7A, if a working channel site ID message is received (decision block 808), the digital receiver 104 squelches analog voter 200 (block 810) and passes the message on to the digital selector 102 (block 804B). If a control channel site ID message is received (decision block 812), the same switching to control channel steps described in connection with blocks 838-804F is performed (blocks 812-818).

FIG. 8 is a flowchart of exemplary program control steps shown in FIG. 7 blocks 804 to send a message to the digital selector 102. To initiate transfer of a message from digital receiver 104 to selector 102, the digital receiver first determines whether FSL 108 has been seized by some other digital receiver (i.e., by simply sensing the logic state of the FSL) (decision block 844). If the FSL has already been seized, digital receiver 104 in the preferred embodiment assumes that its received message is redundant with the message received by the digital receiver which has seized the FSL, discards the received message (block 845), and returns control to the steps shown in FIGS. 7A-7B. If, on the other hand, the FSL 108 is not already seized (indicating that BSL 106 is available for transmission), the digital receiver 104 seizes the FSL, starts an 8.5 ms timer in the preferred embodiment, and resets an interrupt flag (block 846). The digital receiver 104 may then enable an interrupt input pin connected to BSL 106 (block 848; or alternatively, this interrupt input can be enabled at all times and the FIG. 9 interrupt routine thus executed every time a signal occurs on the BSL regardless of whether the digital receiver is attempting to transfer a message to selector 102). The digital receiver 104 then waits a delay time Delta T corresponding to its unique time window value (block 850). As explained previously, each of digital receivers 104 waits a different delay time Delta T at block 850 (e.g., depending upon a DIP switch setting) so that the beginning of their respective transmission windows differ in timing with respect to the time FSL 108 was seized.

During the entire time digital receiver 104 waits delay time Delta T at block 850, the digital receiver remains sensitive to being "interrupted" by the occurrence of an initial "start bit" transmitted over BSL 106 by another digital receiver 104 which also seized FSL 108 at substantially the same time but which has an earlier "start transmission" window assignment. If such a start bit occurs on BSL 106 during the time the digital receiver 104 is timing delay time Delta T, the BSL interrupt routine shown in FIG. 9 is performed. As will be understood by those skilled in this art, an interrupt routine "interrupts" or suspends the normal execution of a program by a processor in response to an event (e.g., the appearance of a signal on BSL 106) and performs an interrupt handling routine instead. At the conclusion of the interrupt handling routine, control typically returns to the suspended program execution.

If, in the preferred embodiment, a BSL generated interrupt does occur while digital receiver 104 is waiting for its transmission window to begin (FIG. 9 block 862), digital receiver 104 assumes that the message it has received is redundant with the message being transferred on the BSL, discards its message and aborts the entire FIG. 8 process (e.g., by setting a flag; block 864), disables BSL interrupts if desired (block 866), and returns from interrupt (block 870). If no interrupt occurs during this wait time, on the other hand (referring once again to FIG. 8), the digital receiver transmits its message over the BSL 10 (block 852; this step is only performed if the interrupt flag is unset), may disable BSL interrupts (block 854), continues to wait for the 8.5 ms redundancy removal time to expire (block 856), and finally releases the FSL 108 when that time does expire (block 858).

Note that in the preferred embodiment blocks 854-858 are performed whether or not interrupt routine shown in FIG. 9 detects a signal on the BSL 106. Thus, even a digital receiver 104 which aborts its message transmission in the preferred embodiment continues to seize the FSL 108 for the entire 8.5 ms redundancy removal period in the preferred embodiment.

It should be noted that the time required for digital receiver 104 to perform the steps shown in FIG. 9 has a direct relationship in the preferred embodiment to the minimum duration of the time windows W illustrated in FIGS. 4 and 5 (as was discussed above). Specifically, the probability of an actual collision on BSL 106 increases with the inherent inaccuracy of digital receiver 104 in detecting the signal transition on BSL 106—and that inaccuracy increases with the time it takes for the FIG. 9 interrupt routine to execute. While techniques may reduce this inherent inaccuracy (e.g., providing the FIG. 9 interrupt routine with a very high priority in an interrupt priority structure so that the digital receiver 104 will "drop everything" in order to detect BSL activity), it cannot be eliminated.

The interaction between the main site S1 and its associated voter digital receiver 104(1) will now be discussed. In the working channel mode, upon receipt of a mobile initial key signal, channel assignment messages originated by the main site (either by primary site controller 410 or by the main site control channel trunking card when in failsoft mode) are converted into special key messages and are applied to digital receiver 104(1)

to indicate that the channel has been assigned. The main site S1 then sends all locally received RF digital messages to digital receiver 104(1) to be voted on by digital voter 100. When the main site generates a drop channel message (at the conclusion of a communication/channel assignment) this message too is applied to digital receiver 104(1). In the preferred embodiment, when digital selector 102 votes on a drop channel message, it echoes this message to all of those digital receivers 104—which in turn echo it to their associated satellite receiver sites S2-14 SN.

In control channel mode, channel requests received on the main site RF port are acted upon locally (a mentioned previously). Any signals received by main site S1 by digital voter 100 are compared with previous locally received messages and redundant messages are discarded. Thus, only the occasional control channel message successfully received by one or more satellite receivers sites S2-SN but not received by main site S1 will affect the operation of main site S1 after passing through digital voter 100 in the preferred embodiment.

In both working and control channel modes, site ID messages are generated by main site S1 every four seconds during periods of system idle. The information in these messages is obtained from site IDs generated by the primary site controller 410. Voter system 100 uses the information in these site IDs to determine operating mode.

The interaction between satellite receiver S2-Sn and their associated voter digital receivers 104(2)-104(N) will now be explained. In working channel mode, channel assignments received by the satellite site control channel monitor 220 are converted into special key messages and sent to digital voter 100. On the inbound working channel, handshaking is detected by the satellite site working channel RF receiver. The satellite sites S2-SN also transmit all locally received RF messages to the digital voter to be voted on. When a digital receiver 104 associated with a satellite receiver site S2-SN receives an echoed drop or unkey message from digital selector 102 (i.e., these messages are originated by the main site S1), the digital receiver echoes this message to the associated satellite site.

In control channel mode, channel requests received by a satellite receiver site control channel RF receiver are relayed to digital voter 100. In both working channel and control channel modes, site ID messages are generated every four seconds by the satellite receiving site during periods of system idle. The information contained in these messages is obtained from site IDs transmitted over the main site S1 control channel and received by the satellite receivers site via its control channel monitor 220.

In the preferred embodiment, the communications link between digital voter 100 and main site S1 includes a first communications link 110(1) to transfer messages form the main site S1 to its associated digital receiver 104(1); and a further wire pair 112 carrying messages from digital selector 102 to the main site. In the preferred embodiment, digital selector 102 is also connected to communications link 110(1) to permit the digital selector to listen to messages that need to be echoed to all other digital receivers 104(2)-104(N). In working channel mode, the digital selector 102 keeps the main site modem trained between clear voice transmissions. Digital messages are transmitted from digital selector 102 to main site S1 as they are received from digital receivers 104 (see FIGS. 10A, 10B, blocks 910-914, 950-958). In clear voice transmissions (during which time an analog voter 200 performs the voting function), digital selector 102 monitors the analog voter receiving line. If this analog voting receiving line becomes active (indicating that all site receivers have lost RF carrier), digital selector 102 mutes the analog voter 200 associated with the channel, trains the main site S1 modem, and generates an unkey message. Also, during clear voice analog voting, digital selector 102 echoes all the unkey and drop channel messages received from any digital receiver 104 back through all digital receivers (see FIGS. 10A and 10B, blocks 900-908, 928-932, 934-940, 950-966)).

In control channel mode, digital selector 102 passes channel requests and site IDs as it receives them (so that the modem link is always trained).

Digital voter 100 (and all other components of the training system) is required to operate in one of two modes: control channel and working channel. The transition from one mode to another must occur immediately upon receipt of a message containing operating mode information, and be complete before receipt of the next message. Both modes are described below in detail with their associated system messages as they apply to voter 100.

In the PST system, the control channel traffics only digital messages. These messages are transmitted with twelve bit CRCs which insure that a received message is bit for bit correct. Therefore, the purpose of the voter 100 on this channel is to eliminate redundant messages without adversely affecting the system access time and maximizing the transparency of added satellite receivers. This allows the system controller function to be identical whether or not there are satellite receiver sites in the system.

Presently, there are two types of messages transmitted on the control channel: single slot and double slot. These two messages encompass all types of calls, including clear voice, special call, Voice Guard and data.

Channel requests are inbound control channel messages sent by a calling unit to the system controller to request a working channel on which to transmit. All types of requests are one slot messages except for individual and data call requests which are double slot messages. All sites which receive channel requests send them to their respective digital receivers 104 in the following exemplary message format:

| S1 | S2 | MT | B1 | B2 | B3 | B4 | B5 |

| | | |
|---|---|---|
| S1 | Barker 1 | 57H |
| S2 | Barker 2 | 12H |
| MT | message type | 08H |
| B1-B3 | message bytes | |
| B4 | last 4 message bites first 4 CRC bits | |
| B5 | final 8 CRC bits | |

Digital receivers 104 send the requests on to the selector 102 using the protocol described previously. The selector 102 in turn transmits the requests on to the main site S1 for action by the system controller 410.

Individual and data call requests are two slot messages, rather than one slot as all other request types. When a receiver site S1-SN decodes one of these requests, it concatenates the two slots into one message which is transmitted to the digital receiver 104. The exemplary message format is shown below.

| S1 | S2 | MT | B1 | B2 | B3 | B4 | B5 | b1 | b2 | b3 | b4 | b5 |
|----|----|----|----|----|----|----|----|----|----|----|----|----|

| | | |
|---|---|---|
| S1 | Barker 1 | 57H |
| S2 | Barker 2 | 12H |
| MT | message type | 09H |
| B1-B3 | message bytes | slot 1 |
| B4 | last 4 message bits | slot 1 |
| | first 4 CRC bits, | slot 1 |
| B5 | final 8 CRC bits | slot 1 |
| b1-b3 | message bytes | slot 2 |
| b4 | last 4 message bits | slot 2 |
| | first 4 CRC bits | slot 2 |
| b5 | final 8 CRC bits | slot 2 |

Voter 100 then votes on this single packet.

Site IDs are essentially system null messages which are used to verify system status and communication line integrity during periods of system idle. They contain the location of the current control channel and are the means by which a new control channel assignment is relayed to the voter 100. The main and satellite sites generate site IDs approximately every four seconds when there are no other messages to send. Each time any type of message is sent, the site ID timer is reset. Absence of activity on any of the telephone lines for eight seconds or greater indicates a problem exists either with the line involved or the trunking card responsible for sending the messages.

Main site S1 trunking card 400 receive the information to include in the generated site ID from the system controller 410. Satellite receivers S2-14 SN obtain this information from site IDs received from the control channel monitor 220. These IDs are in turn relayed from the digital receivers 104 to the selector 102 and back to the main site S1.

On the control channel, site IDs are always enabled (meaning their transmission is never disabled at the detection of a message type as in working channel mode). Because of this, the control channel must protect itself against collisions with site IDs on the link between the digital receiver 104 and the selector 102. There is no way to guarantee that a collision will not occur, but the possibility of a collision is made as low as possible. To achieve this in the preferred embodiment, constraints are put on when a site ID message can be transmitted in relation to the outbound control channel 15 ms frame. The constraints are set up such that if there is a channel request in the current frame, it will precede the site ID and thus always acquire the voter BSL 106 first. If a collision still occurs, the radio will take normal action and repeat the request. The exemplary format for site IDs throughout the system is shown below:

| S1 | S2 | MT | B1 | B2 | B3 | B4 | B5 |
|----|----|----|----|----|----|----|----|

| | | |
|---|---|---|
| S1 | Barker 1 | 57H |
| S2 | Barker | 12H |
| MT | message type | 10H |
| B1-B3 | message bytes | |
| B4 | last 4 message bits | |
| | first 4 CRC bits | |
| B5 | final 8 CRC bits | |

The primary type of call made on PST systems involves the transmission of clear voice. There are several different call types which include clear voice, and several digital messages associated with each. The following section details these digital messages and their use in the call.

When a calling unit places any type of call, it first sends out a channel request on the control channel.

When the channel assignment is received from the system, the radio transmits 40 ms of dotting which serves as the initial handshake. A satellite or main site receiver detecting this dotting sends a special key message to its digital receiver 104 indicating clear voice is to follow.

The special key message is a message created by the receiver sites S1-SN using the associated channel assignment for that call. This message is needed by the voter 100, as dotting is sent continuously to the digital receivers 104 in between messages, and cannot be distinguished as a unique message as it can on the RF channel. The site receivers S1-SN only look for the handshake dotting for 180 ms after a channel assignment is seen on the outbound control channel. The special key message exemplary format is shown below:

| S1 | S2 | MT | B1 | B2 | B3 | B4 | B5 |
|----|----|----|----|----|----|----|----|

| | | |
|---|---|---|
| S1 | Barker 1 | 57H |
| S2 | Barker 2 | 12H |
| MT | message type | 1AH |
| B1-B3 | message bytes | |
| B4 | last 4 message bits | |
| | first 4 CRC bits | |
| B5 | final 8 CRC bits | |

After the special key message has been relayed through the voter 100 and the analog voter 200 is voting clear audio, the satellite and main sites S1-SN begin looking for an unkey message or loss of carrier of loss of low speed data. When the unkey message is detected, the receiver sites proceed with the mute procedure followed by the unkey message in the exemplary format shown below:

| S1 | S2 | MT | B1 | B2 | B3 | B4 |
|----|----|----|----|----|----|----|

| | | |
|---|---|---|
| S1 | Barker 1 | 57H |
| S2 | Barker 2 | 12H |
| MT | message type | 1BH |
| B1-B2 | message bytes | |
| B3 | last 4 message bits | |
| | first 4 CRC bits | |
| B4 | final 8 CRC bits | |

The unkey message is relayed through the voter 100, as well as echoed back from the selector 102 to all digital receivers 104, in the above format. If carrier is lost before an unkey is detected, the site will apply 1950 Hz tone to the line, squelching the corresponding analog voter audio unit.

In a trunked call with no hang time, the main site generates a drop channel message called a special drop which is transmitted to the site controller and to the voter 100 working channel 100 ms after it receives an unkey. Dotting is transmitted in the 100 ms interim period. The special drop informs voters 70 that the call is over and the channel has gone down (therefore, they should return to their respective idle states). This exemplary drop channel message format is shown below:

| S1 | S2 | MT | B1 | B2 | B3 | B4 |

| | | |
|---|---|---|
| S1 | Barker 1 | 57H |
| S2 | Barker 2 | 12H |
| MT | message type | B1H |
| B1-B2 | message bytes | |
| B3 | last 4 message bits<br>first 4 CRC bits | |
| B4 | final 8 CRC bits | |

Reception of a site ID by the main site S1 while expecting an unkey will also cause the main site to generate a special drop message. Special drops are echoed by the selector 102 back to all digital receivers 104, and in return are echoed to the satellite sites S(2)-S(N). In this way, all components are informed that the channel has gone down. Standard drop channel messages which are sent from calling units to force a channel down are handled by the voter 100 identically to the special drop message.

A message trunked call is one which takes place on a system having a hang time. The initial transmission of a clear voice message trunked call occurs. However, after the unkey is sent from the calling unit, the channel is not dropped by the main site immediately. Instead, it waits for the specified hang time to elapse before sending the drop. If another PTT is made during the hang time, the channel does not have to the reassigned. In this case, a keyed message is sent on the inbound working channel by the calling unit. The keyed message is relayed through the voter in the following exemplary format:

| S1 | S2 | MT | B1 | B2 | B3 | B4 |

| | | |
|---|---|---|
| S1 | Barker 1 | 57H |
| S2 | Barker 2 | 12H |
| MT | message type | 1BH |
| B1-B2 | message bytes | |
| B3 | last 4 message bits<br>first 4 CRC bits | |
| B4 | final 8 CRC bits | |

The audio voting and unkey procedure are the same as a message trunked call. After each unkey message is sent, the system begins the hang time procedure again.

If a detected channel assignment is a special call assignment, the voter 100 prepares to handle the special signalling which follows. When the handshake dotting is seen on the inbound working channel byte the satellite or main sites, the sites begin accumulating blocks of data. After all blocks have been sent by the calling radio, the sites send the blocks they have received to their digital receiver 104 in the exemplary format shown below:

| S1 | S2 | MT | 00 | B1 | B2 | B3 | B4 | S1 | S2 | MT | b# | b1 | b2 |

| | | |
|---|---|---|
| S1 | Barker 1 | 57H |
| S2 | Barker 2 | 12H |
| MT | message type | E6H |
| 00 | block number - always 00 in first block | |
| B1-B4 | message bytes | |
| b# | block number | |

If a site misses a block, that block will simply not be sent to the digital receiver 104. Missing blocks will either be obtained from other digital receivers 104, or the main site S1 will request that the missing blocks be sent again.

Digital receivers 104 receiving special call data send it on to the selector 102 using the protocol discussed above. This introduces the possibility of losing blocks. If a digital receiver 104 with missing blocks captures the sync line, another digital receiver having those blocks could be caused to "dump" its data if it attempted to use the voter BSL 106 while the first was transmitting to the selector 102. The main site S1 keeps track of all blocks received and requests that blocks not received locally or from the selector 102 be retransmitted. After all blocks have been received by the main site S1, it sends them to the site controller 410. At this point, the calling radio sends an unkey message which serves as a special call signalling termination.

A data call is initiated in the same manner as a clear voice call. When the main or satellite site receivers assigned as the working channel detect the incoming data packets, the packets are sent to the voter digital receivers 104 in the following exemplary format:

| S1 | S2 | MT | HH | FH | P1 | . . . . . . . . . | Pn |

| | | |
|---|---|---|
| S1 | Barker 1 | 57H |
| S2 | Barker 2 | 12H |
| MT | message type | 54H |
| HH | half header | 5 bytes |
| FH | full header | 5 bytes - presently only on first burst |
| P1-Pn | data packets | |

The protocol determining which digital receiver 104 sends the data to the selector 102 is identical to that for other call types, except for the operation of the FSL sync line 108. Once a digital receiver 104 has captured the FSL 108, it will hold the FSL 108 active for the entire duration of the data transmission. On an active working channel the site ID is treated differently than on a control channel. Protection is needed to prevent site IDs from colliding with keys and unkeys on the BSL 106 between the digital receivers 104 and the selector 102. The possibility for collision exists when a digital receiver 104 detects activity on the BSL 106 at the time it has a message to transmit. Such a detection causes the digital receiver 104 to "dump" its message. Thus, no site IDs can be transmitted to the selector 102 while the channel is assigned in order to prevent a more important message from being dumped.

The following preventative actions are implemented in working channel mode in the preferred embodiment to keep site IDs off the voter BSL 106 while a call is in progress:

1. Upon receiving a channel assignment, the main site S1 disables site ID generation. Site ID generation is not enabled again until after the channel drops. When this happens, the main site S1 will generate a special drop and send it to the voter. Once the special drop message is transmitted, site ID generation resumes. The special drop is a standard working channel inbound drop message with a unique header type.
2. Upon receiving a channel assignment, the satellite receivers S2-SN disable site ID generation. Site ID generation is not enabled again until after an unkey or a drop is received (either locally or from its digital receiver 104). Site ID generation is resumed after receipt of an unkey to cover missed unkeys at the voter 100. In this event, the digital receiver 104 recovers from a "hung" condition upon receipt of the site ID.

3. At the digital receiver 104, site ID generation is disabled while the channel is assigned. The digital receiver 104 knows the channel is assigned if it receives a special key or a keyed message from its associated site, or an echoed special key or a keyed message from the selector 102. The site ID transmit remains disabled until a drop or special drop message is received from either the site or the selector 102.

4. The main site S1 treats a site ID message as an unkey message if a call is in progress. In order to take advantage of this, the selector 102 generates site IDs after every unkey (see FIG. 10A, block 956) until a special drop is received either from the main site S1 or from a digital receiver 104 (see FIG. 10B, Block 960). Reception of site IDs from the main site S1 also signal the selector 102 that the channel is down, and cause it to generate a drop if one was not received earlier. In this case, site ID generation will resume after the generated drop. If neither of these messages are detected by the selector, site ID generation will be terminated on the next call.

The site ID message format for the voter is the same for the working channel as for the control channel.

While the invention has been described in connection With what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In an RF trunking system of the type including plural spatially separated receiving sites S1-SN each including digital RF receiving means for receiving digitally encoded RF signals transmitted by mobile/portable RF transceivers over a slotted inbound RF channel, for decoding said received signals to provide corresponding digital messages and for communicating said digital messages to a centralized digital voter apparatus, said centralized digital voter apparatus comprising:

receiving means operatively connected to said plural receiving sites for receiving and temporarily storing said communicated digital messages;

redundancy removal time period means for defining a redundancy removal time period; and means operatively connected to said receiving means and to said redundancy removal time period means for selecting and outputting any one message received by said receiving means during said defined redundancy removal time period and for removing all other messages received by said receiving means during said defined redundancy removal time period.

2. In an RF trunking system of the type including plural spatially disparate receiving sites S1-SN each including digital RF receiving means for receiving digitally encoded RF signals transmitted by mobile/portable RF transceivers and for decoding said received signals to provide corresponding digital messages, a digital voter apparatus comprising:

plural digital receiving means, each operatively connected to a corresponding one of said plural spatially disparate receiving sites, each of said digital receiving means for receiving said digital messages provided by the receiving site corresponding thereto;

redundancy removal time period means operatively coupled to said plural digital receiving means for defining a redundancy removal time period; and selector means, connected to each of said plural digital receiving means and to said redundancy removal time period means, for selecting and outputting a single message received by any of said plural digital receiving means during said defined redundancy removal time period and for removing all other messages received by said plural digital receiving means during said defined redundancy removal time period.

3. In an RF trunking system of the type including first and second geographically located receiving sites S1 and S2 each including digital RF receiving means for receiving digitally encoded RF signals transmitted by mobile/portable RF transceivers and for decoding said received signals to provide corresponding digital messages, a digital voter apparatus comprising:

first digital RF receiving means operatively connected to said first receiving site S1 for receiving and temporarily storing a first digital message provided by said first receiving site S1;

second digital RF receiving means operatively connected to said second receiving site S2 for receiving and temporarily storing a second digital message provided by said second receiving site S2;

digital selector means for outputting one of said first and second digital messages; and bus means for connecting said first and second digital RF receiving means and said digital selector means;

said first digital receiving means including first transmitting means for transmitting said first digital message over said bus means to said digital selector means beginning at a time $T_0 + \text{Delta } T_1$; and said second digital receiving means including:

second transmitting means connected to said for transmitting said second message over said bus means to said selector means beginning at time $T_0 + \text{Delta } T_2$, $\text{Delta } T_2 > \text{Delta } T_1$, detecting means connected to said bus means for detecting the occurrence of signals on said bus means, and means connected to said detecting means and to said second transmitting means for inhibiting said second transmitting means from transmitting in response to detection of signals by said detecting means between time $T_0$ and time $T_0 + \text{Delta } T_1$.

4. A system as in claim 3 wherein said first transmitting means includes means for transmitting said first message over a time period longer than time period $\text{Delta } T_2 - \text{Delta } T_1$.

5. In an RF trunking system of the type including geographically located receiving sites S1 each including digital RF receiving means for receiving digitally encoded RF signals transmitted by mobile/portable RF transceivers and for decoding said received signals to provide corresponding digital messages, a voting method comprising:

(a) receiving and temporarily storing a digital message provided by a first receiving site;

(b) timing a preset window delay time associated with said first receiving site beginning at a time $T_0$;

(c) concurrently with said timing step (b), monitoring a digital signal bus for the occurrence of a signal;

(d) transmitting said first digital message over said digital signal bus beginning upon elapse of said window delay time if no signals are detected by said monitoring step (c) prior to the time said window delay time elapses; and (e) discarding said first digital message if said monitoring step (c) detects the occurrence of a signal on said digital signal bus between time $T_0$ and elapse of said window delay time.

6. A method as in claim 5 wherein said transmitting step (d) includes transmitting said first message over a duration longer than said window delay time.

7. In an RF trunking system of the type including first and second geographically located receiving sites each including digital RF receiving means for receiving digitally encoded RF signals transmitted by mobile/portable RF transceivers and for decoding said received signals to provide corresponding digital messages, a voting method comprising:

(a) receiving and temporarily storing a digital message provided by a first receiving site;

(b) testing whether a service request line FSL is inactive;

(c) if said testing step (b) reveals said service request line FSL is not inactive, discarding said digital message received by said receiving step (a) and inhibiting a transmitting step (g);

(d) if said testing step (c) reveals said service request line FSL is inactive, seizing said service request line;

(e) timing a window delay time associated with said first receiving site beginning at the time said seizing step (d) seizes said service request line;

(f) concurrently with said timing step (b), monitoring a serial signal bus BSL for the occurrence of a signal;

(g) transmitting said first digital message over said serial signal bus BSL beginning upon elapse of said timed window delay time if no signals are detected by said monitoring step (f); and (h) discarding said first digital message if said monitoring step (f) detects the occurrence of a signal on said digital signal bus between the time said seizing step (d) seizes said service request line FSL and elapse of said timed window delay time.

8. A method as in claim 7 wherein said transmitting step (g) includes the step of transmitting said first digital message over a time period exceeding said timed window delay time.

9. In an RF trunking system of the type including plural spatially separated receiving sites S1-SN, a method of processing received signals comprising the following steps:

(a) receiving a digitally encoded RF signal transmitted by mobile/portable RF transceiver over a slotted inbound RF channel at each of said plural receiving sites;

(b) decoding said received signal at each site to provide a corresponding digital message;

(c) communicating said digital message from each site to a centralized voter location;

(d) receiving and temporarily storing said digital messages M1-MN from said corresponding receiving sites S1-SN at said centralized voter location;

(e) scheduling said stored messages M1-MN for application to a common digital signal bus BSL beginning with discrete successive adjacent non-overlapping corresponding time windows W1-WN; and (f) performing the following steps independently for each of said stored messages M(k):

(f1) monitoring said common digital signal bus BSL for signals during the time between a first time $T_0$ and the occurrence of said time window W(k) corresponding to said stored message M(k), (f2) applying said message M(k) to said common digital signal bus BSL beginning within said corresponding time window W(k) and continuing after said time window W(k) elapses if no common digital signal bus BSL signals are monitored by said monitoring step (f1), and (f3) inhibiting said applying step (f2) and discarding said message M(k) if said monitoring step (f1) monitors digital signal bus BSL signals occurring after said first time $T_0$ and before the occurrence of said corresponding time window W(k).

10. A method as in claim 9 wherein:

said receiving step (a) comprise receiving, at each of said sites, a message occupying a plurality of inbound control channel slots; and said decoding step (b) includes the step of packing said received plural-slot message into a single digital message for communicating by said communication step (c).

11. A method as in claim 9 wherein said method further includes the following steps:

decoding messages applied to said bus BSL; and if said decoding step reveals said message is an unkey message, communicating said unkey message to each of said receiving sites.

12. A method as in claim 9 wherein said method further includes the following steps:

periodically generating site ID messages at each of said receiving sties and communicating said site ID messages to said centralized voter location; and determining based on messages recently applied to said bus BSL whether an RF communication is in progress; and selectively ignoring said communicated site ID messages in response to the results of said determining step.

13. In an RF trunking system of the type including plural spatially separated receiving sites S1-SN, a method of processing received signals comprising the following steps:

(a) receiving a digitally encoded RF signal transmitted by mobile/portable RF transceiver over a slotted inbound RF channel at each of said plural receiving sties;

(b) decoding said received signal at each site to provide a corresponding digital message;

(c) communicating said digital message from each site to a centralized voter location;

(d) receiving and temporarily storing said digital messages M1-MN from said corresponding receiving sites S1-SN at said centralized voter location;

(e) seizing a common service request line at the beginning of a redundancy removal time period;

(f) dividing said redundancy removal time period into plural discrete non-overlapping time windows W1-WN corresponding to said receiving sites S1-SN; and (g) performing the following steps independently for each of said stored messages M(k):
  (g1) monitoring a common digital signal bus BSL for signals occurring during said redundancy removal period prior to the occurrence of said time window W(k) corresponding to said stored message M(K),
  (f2) applying said message M(k) to said common digital signal bus BSL beginning within said corresponding time window W(k) and continuing after said time window W(k) elapses if no common digital signal bus BSL signals are monitored by said monitoring step (g1), and
  (g3) inhibiting said applying step (g2) and discarding said message M(k) if said monitoring step (g1) monitors digital signal bus BSL signals occurring during any of said time windows W(1)−W(k−1) before the occurrence of said corresponding time window W(k).

14. A method as in claim 13 wherein:
said applying step (g2) requires a certain time period; and
the durations of each of said time windows W(1)-W(N) are less than said certain time period.

15. A method as in claim 13 wherein said time windows W(1)-W(N) have equal durations.

16. A method as in claim 13 wherein said time windows W(1)-W(N) are successive in time.

17. A method as in claim 13 wherein said time windows W(1)-W(N) are adjacent in time.

18. A method as in claim 13 wherein:
said dividing step (f) includes the step of scheduling said messages M(1)−M(N) for application to said serial data bus in a predetermined sequence; and
said inhibiting step (g3) includes the step of preventing all but one of said messages M(1)-M(N) from being applied to said serial data bus.

19. A method as in claim 13 wherein:
said seizing step is performed in response to arrival of a message M(1)-M(N) at said central location; and
said method further includes the step of releasing said service request line a predetermined fixed time period after said seizing step seized said line.

20. A method as in claim 19 wherein said predetermined fixed time period is on the order of 8.5 ms.

21. A digitally trunked RF communications system comprising:
a main RF communications site including RF transceiving means for transmitting RF signals to and receiving digitally encoded and analog RF signals from mobile/portable RF transceivers, said main RF communications site further including control channel transceiving means for transmitting synchronization and control signals on an outbound RF communications channel frequency and for receiving control signals on an inbound RF communications channel frequency;
at least one satellite receiving site geographically distant to said main site, said satellite site including RF receiving means for receiving digitally encoded and analog RF signals from said mobile/portable RF transceivers, said satellite receiving site further including a control channel monitoring means connected to said RF receiving means for monitoring said synchronization signals transmitted by said main site on said outbound control channel frequency and for synchronizing said RF receiving means with said received synchronization signals;
multiplexed first communications link means connecting said satellite site RF receiving means to a central location for communicating received digital and analog signals form said satellite RF receiving means to a voter means;
multiplexed second communications link means connecting said main site RF transceiving means to said central location for communicating received digital and analog signals from said main site RF transceiving means to said voter means; and
voting means disposed at said central location and connected to said first and second multiplexed communications link means for determining which of said signals communicated thereto within a preset redundancy removal time period are redundant, for selecting only one version of said redundant signals, and for communicating said selected signal version to said main site RF transceiving means.

22. A system as in claim 21 wherein said voter means includes:
first digital receiving means, operatively connected to said multiplexing first communications link means, for receiving digital messages provided by the satellite site RF receiving means;
second digital receiving means, operatively connected to said multiplexing second communications link means, for receiving digital messages provided by the main site RF transceiving means;
redundancy removal time period means operatively coupled to said first and second digital receiving means for defining a redundancy removal time period; and
selector means, connected to each of said plural digital receiving means and to said redundancy removal time period means, for selecting and outputting a single message received by any of said plural digital receiving means during said defined redundancy removal time period and for removing all other messages received by said plural digital receiving means during said defined redundancy removal time period.

* * * * *